US008656127B2

(12) United States Patent
Matsushima et al.

(10) Patent No.: US 8,656,127 B2
(45) Date of Patent: Feb. 18, 2014

(54) INFORMATION PROCESSING TERMINAL, METHOD, PROGRAM, AND INTEGRATED CIRCUIT FOR CONTROLLING ACCESS TO CONFIDENTIAL INFORMATION, AND RECORDING MEDIUM HAVING THE PROGRAM RECORDED THEREON

(75) Inventors: Hideki Matsushima, Osaka (JP); Natsume Matsuzaki, Osaka (JP); Kouji Kobayashi, Osaka (JP); Masao Nonaka, Osaka (JP)

(73) Assignee: Panasonic Corporation, Osaka (JP)

( * ) Notice: Subject to any disclaimer, the term of this patent is extended or adjusted under 35 U.S.C. 154(b) by 278 days.

(21) Appl. No.: 13/319,692

(22) PCT Filed: Feb. 9, 2011

(86) PCT No.: PCT/JP2011/000710
§ 371 (c)(1),
(2), (4) Date: Nov. 10, 2011

(87) PCT Pub. No.: WO2011/114617
PCT Pub. Date: Sep. 22, 2011

(65) Prior Publication Data
US 2012/0060008 A1 Mar. 8, 2012

(30) Foreign Application Priority Data
Mar. 15, 2010 (JP) ................. 2010-058239

(51) Int. Cl.
*G06F 12/14* (2006.01)
*G06F 12/16* (2006.01)
(52) U.S. Cl.
USPC .............. 711/163; 711/154; 726/27; 726/28; 713/151; 713/171
(58) Field of Classification Search
USPC ........ 711/154, 163; 726/27, 28; 713/161, 171
See application file for complete search history.

(56) References Cited

U.S. PATENT DOCUMENTS

2003/0061166 A1 3/2003 Saito et al.
2004/0123122 A1 6/2004 Asai et al.
(Continued)

FOREIGN PATENT DOCUMENTS

JP 2002-268549 9/2002
JP 2003-099400 4/2003
(Continued)

OTHER PUBLICATIONS

International Search Report issued May 17, 2011 in International (PCT) Application No. PCT/JP2011/000710.
TCG Mobile Reference Architecture Specification version 1.0, Jun. 2007.

*Primary Examiner* — John Lane
(74) *Attorney, Agent, or Firm* — Wenderoth, Lind & Ponack, L.L.P.

(57) ABSTRACT

An information processing terminal (101) includes: a storage area (206), in which general information (211) and confidential information (210) are recorded; an input/output receiving unit (201) which receives an access command to general information (211) or confidential information (210); a route information holding unit (203) in which route information is held, the route information indicating an area of activity in which access to the confidential information (210) is allowed; a current location acquisition unit (304) which acquires current location information indicating the current location of the information processing terminal (101); an access determination unit (305) which allows access to the confidential information (210) when the location of the information processing terminal (101) indicated by the current location information is in the route information; and a confidential information access unit (306) which accesses the confidential information (210) in response to the access allowance by the access determination unit (305).

15 Claims, 17 Drawing Sheets

(56) References Cited

U.S. PATENT DOCUMENTS

| | | |
|---|---|---|
| 2004/0190715 A1 | 9/2004 | Nimura et al. |
| 2004/0215955 A1* | 10/2004 | Tamai et al. ............... 713/150 |
| 2005/0222970 A1 | 10/2005 | Makino |
| 2007/0294534 A1 | 12/2007 | Asai et al. |
| 2008/0134347 A1* | 6/2008 | Goyal et al. ............... 726/29 |
| 2012/0047553 A1* | 2/2012 | Stronger et al. ............... 726/1 |

FOREIGN PATENT DOCUMENTS

| | | |
|---|---|---|
| JP | 2004-302930 | 10/2004 |
| JP | 2005-293034 | 10/2005 |
| JP | 2009-260829 | 11/2009 |
| WO | 2004/013744 | 2/2004 |

\* cited by examiner

INFORMATION PROCESSING TERMINAL, METHOD, PROGRAM, AND INTEGRATED CIRCUIT FOR CONTROLLING ACCESS TO CONFIDENTIAL INFORMATION, AND RECORDING MEDIUM HAVING THE PROGRAM RECORDED THEREON

TECHNICAL FIELD

The present invention relates to a method of preventing leakage of personal information of a patient from an information processing terminal in the medical industry introducing advanced IT, the information processing terminal being carried by a nurse who visits the patient at home after the nurse records the personal information of the patient.

BACKGROUND ART

In recent years, advanced IT application such as introduction of electronic charts is widely seen in the medical industry for the purpose of increasing the efficiency of data management and processing. Because the number of days of a patient's stay in a hospital tends to decrease, increasing attention is being focused on home nursing. Advanced IT enables a home visiting nurse for home nursing to record personal information for a great number of patients all at once into an information processing terminal, and to carry it with the home visiting nurse. On the other hand, in the case where the information processing terminal is stolen during the visit, a problem of disclosure of privacy arises.

As a technique for protecting privacy, there is a technique (for example, see Patent Literature 1), in which the information recorded in the information processing terminal is encrypted, while access control is performed with the location information and temporal information obtained by GPS (Global Positioning System).

In addition, techniques for performing access control using location information includes another technique (for example, see Patent Literature 2), in which information is encrypted using the location information obtained from a GPS as a key.

CITATION LIST

Patent Literature

[PTL 1]
Japanese Unexamined Patent Application Publication No. 2002-268549
[PTL 2]
Japanese Unexamined Patent Application Publication No. 2004-302930

SUMMARY OF INVENTION

Technical Problem

However, the above-mentioned conventional techniques have the following problems.

That is to say, with the above-mentioned conventional techniques, in the case where the information processing terminal and the authorization code are stolen at the same time in a use case such as home nursing, there is a problem in that unauthorized access to information can be made in a predetermined range.

To cope with such a problem, a method has been devised, in which access control is performed with additional temporal information. However, tampering of temporal information which is stored in the information processing terminal is not necessarily difficult, thus the above method did not provide a sufficient measure.

Now, the present invention has been made in light of the above-mentioned problems, and it is an object of the invention to provide an information processing terminal and a confidential information access control method that can protect against leakage of information even when the information processing terminal in which confidential information regarding privacy such as home nursing has been recorded is carried outside and stolen.

Solution to Problem

An information processing terminal according to one aspect of the present invention controls access to confidential information. Specifically, the information processing terminal includes: a storage area in which general information and confidential information are recorded; an input/output receiving unit configured to receive, from a user, an access command which is a command to access the general information or the confidential information recorded in the storage area; an accessible area holding unit configured to hold an accessible area designation map which indicates an area of activity in which access to the confidential information is allowed; and a confidential information access control unit configured to determine whether or not access to the confidential information is allowed in response to receiving the access command to the confidential information by the input/output receiving unit. The confidential information access control unit includes: a current location acquisition unit configured to acquire current location information indicating a current location of the information processing terminal; an access determination unit configured to allow access to the confidential information when the location of the information processing terminal indicated in the current location information is on the accessible area designation map held in the accessible area holding unit; and a confidential information access unit configured to access the confidential information recorded in the storage area in response to the allowance of the access by the access determination unit.

Accordingly, an area in which access to the confidential information is allowed can be designated. Consequently, an information processing terminal can be provided, in which access to the confidential information can be made only in a predetermined area of activity.

In addition, the accessible area designation map may indicate route information of the information processing terminal from a starting point to an arrival point. Accordingly, an area in which access to the confidential information is allowed can be limited to the route of the information processing terminal, which is carried outside.

In addition, the accessible area holding unit may hold a plurality of the accessible area designation maps for different routes. Accordingly, a plurality of different routes can be prepared for the information processing terminal beforehand. Consequently, even in the case where a trouble such as a failure occurs, access control on the move can be achieved without reducing user's convenience.

In addition, the information processing terminal may further include an updating unit configured to update content of the accessible area holding unit with the accessible area designation map which is externally acquired. Accordingly, the area in which the information processing terminal can be utilized is not limited to a specific route, thus convenience of use is increased. Here, "updating the content of the accessible area holding unit" includes the following two cases: one case where the accessible area designation map which is already held in the accessible area holding unit is overwritten with a newly acquired accessible area designation map; and the other case where a newly acquired accessible area designation map is written to the accessible area holding unit in which no accessible area designation map is held.

By way of example, the updating unit may includes: a media read/write unit configured to read the accessible area designation map from an external recording medium; and a route information write unit configured to write, to the accessible area holding unit, the accessible area designation map read from the external recording medium by the media read/write unit. Accordingly, the route information of the information processing terminal can be updated via an external medium.

By way of another example, the updating unit may include: a communication unit configured to communicate with an external server; and a route information write unit configured to write, to the accessible area holding unit, the accessible area designation map acquired from the external server by the communication unit. Accordingly, the route information of the information processing terminal can be updated via a network. Consequently, even in the case where a trouble such as a failure occurs, the server can be accessed via a network and the route information can be acquired from the current location. Consequently, access control on the move can be achieved without reducing user's convenience.

In addition, the updating unit may be further configured to calculate a first hash value by inputting acquired the accessible area designation map to a predetermined hash function, and the confidential information access control unit may determine whether or not access to the confidential information is allowed when the first hash value calculated by the updating unit is equal to a second hash value obtained by inputting the accessible area designation map held in the accessible area holding unit to the predetermined hash function. Accordingly, unauthorized replacement of the accessible area designation map can be prevented. Consequently, more secure access control over the confidential information can be achieved.

In addition, the confidential information access control unit may be protected using tamper-resistant technology or Reactive Method. In addition, the confidential information may be recorded in a region of the storage area, having a protection level higher than that of another region in which the general information is recorded. Accordingly, security in the information processing terminal can be achieved with a higher protection level.

The accessible area designation map may be expressed as a set of a plurality of sections. The confidential information recorded in the storage area may be encrypted with a data key. The data key may be encrypted with a distinct section key assigned to each of the sections. The confidential information access unit may be configured to generate the section key based on the current location information acquired by the current location acquisition unit, to decrypt the data key with the generated section key, and to decrypt the confidential information recorded in the storage area with the decrypted data key. Accordingly, the key for access to the confidential information in the information processing terminal cannot be decrypted except for predetermined locations, thus the security can be achieved with a higher protection level.

The accessible area designation map may be expressed as a set of a plurality of sections. In addition, the confidential information access control unit may further include: a current location recording unit in which a section corresponding to the current location of the information processing terminal is recorded; a previous location recording unit in which a section where the information processing terminal has been present immediately before the section recorded in the current location recording unit is recorded; and a location update determination unit configured to cause the current location acquisition unit to acquire the current location information of the information processing terminal regularly, and when the section corresponding to the acquired current location information is different from the section recorded in the current location recording unit, the location update determination unit overwrites content of the previous location recording unit with the section which is recorded in the current location recording unit, and overwrites content of the current location recording unit with the section corresponding to the acquired current location information. The access determination unit is configured to allow access to the confidential information when the section corresponding to the current location information acquired by the current location acquisition unit, and the section recorded in the previous location information are adjacent to each other on the accessible area designation map at a timing when an access command to the confidential information is received by the input/output receiving unit. Accordingly, access control can be made based on the current location information and the previous location information of the information processing terminal. For this reason, more secure and robust access control can be achieved under the conditions of mobile use.

The confidential information recorded in the storage area may be encrypted with the data key. The data key may be encrypted with a section key assigned to each of the sections. The confidential information access unit may generate the section key based on the section corresponding to the current position information acquired by the current location acquisition unit and the section recorded in the previous location recording unit, may decrypt the data key with the generated section key, and may decrypt the confidential information recorded in the storage area with the decrypted data key. Accordingly, access to the confidential information in the information processing terminal cannot be made unless one of predetermined routes is followed without fail. For this reason, thus the security can be achieved with a higher protection level.

A confidential information access control method according to one aspect of the present invention is a method of controlling access to confidential information, the method being performed by an information processing terminal including an storage area in which general information and confidential information are recorded, and an accessible area holding unit configured to hold an accessible area designation map, the accessible area designation map indicating an area of activity in which access to the confidential information is allowed. Specifically, the method includes: receiving an access command from a user to the general information or the confidential information recorded in the storage area; and determining whether or not access to the confidential information is allowed in response to the access command to the confidential information, received in the receiving. The determining includes: acquiring current location information indicating a current location of the information processing terminal; allowing access to the confidential information when the location of the information processing terminal indicated by the current location information is on the accessible area designation map held in the accessible area holding unit; and accessing the confidential information recorded in the storage area in response to the access allowed in the allowing. Accordingly, a confidential information access control method that achieves access control based on the current location information may be provided.

In addition, the accessible area designation map may be expressed as a set of a plurality of sections. The information processing terminal may further include: a current location recording unit in which a section corresponding to the current location of the information processing terminal is recorded; and a previous location recording unit in which a section where the information processing terminal has been present immediately before the section recorded in the current location recording unit is recorded. The determining may further include acquiring the current location information of the information processing terminal regularly, and when the section corresponding to the acquired current location information is different from the section recorded in the current location recording unit, the determining may include overwriting the previous location recording unit with the section which is recorded in the current location recording unit, and overwriting the current location recording unit with a section corresponding to the acquired current location information. The access determination unit may be configured to allow access to the confidential information when the section corresponding to the current location information acquired by the current location acquisition unit, and the section recorded in the previous location information are adjacent to each other on the accessible area designation map at a timing when an access command to the confidential information is received by the input/output receiving unit. Accordingly, a confidential information access control method that achieves access control based on two pieces of location information of the current location information and the previous location information may be provided.

In addition, a program according to one aspect of the present invention is for causing a computer to execute the above-described method of controlling access to confidential information. In addition, the above-mentioned program may be recorded in a computer-readable recording medium.

An integrated circuit according to one aspect of the present invention controls access to confidential information. Specifically, the integrated circuit includes: a storage area in which general information and confidential information are recorded; an input/output receiving unit configured to receive an access command from a user to the general information or the confidential information recorded in the storage area; an accessible area holding unit configured to hold an accessible area designation map, the accessible area designation map indicating an area of activity in which access to the confidential information is allowed; and a confidential information access control unit configured to determine whether or not access to the confidential information is allowed in response to receiving an access command to the confidential information at the input/output receiving unit. The confidential information access control unit includes: a current location acquisition unit configured to acquire current location information indicating a current location of the information processing terminal; an access determination unit configured to allow access to the confidential information when the location of the information processing terminal indicated by the current location information is on the accessible area designation map held in the accessible area holding unit; and a confidential information access unit configured to access to the confidential information recorded in the storage area in response to the access allowed by the access determination unit.

Advantageous Effects of Invention

According to the present invention, access to the confidential information is allowed only when a user, who is the owner of an information processing terminal, follows one of the predetermined routes correctly. For this reason, even when a person in bad faith steals and takes the information processing terminal, and tries to access the confidential information on a location outside the predetermined routes, the access is rejected. Consequently, leakage of the confidential information can be prevented.

BRIEF DESCRIPTION OF DRAWINGS

FIG. 1 is an overall configuration diagram of a confidential information access control system in Embodiment 1 of the present invention.
FIG. 2 is a configuration diagram of a nurse-carried terminal in Embodiment 1 of the present invention.
FIG. 3 is a configuration diagram of a confidential information access control unit in Embodiment 1 of the present invention.
FIG. 4 is a diagram showing an example of route information held by a route information holding unit in Embodiment 1 of the present invention.
FIG. 5 is a flowchart for displaying confidential information in Embodiment 1 of the present invention.
FIG. 6 is a flowchart for determining access to confidential information in Embodiment 1 of the present invention.
FIG. 7 is an overall configuration diagram of a confidential information access control system in Embodiment 2 of the present invention.
FIG. 8 is a configuration diagram of a nurse-carried terminal in Embodiment 2 of the present invention.
FIG. 9 is a diagram showing an example of updated route information held by a route information holding unit in Embodiment 2 of the present invention.
FIG. 10 is a flowchart for updating route information in Embodiment 2 of the present invention.
FIG. 11 is a configuration diagram of a confidential information access control unit in Embodiment 3 of the present invention.
FIG. 12 is a diagram showing the relationship between the current location, the previous location, and route information that are managed by the confidential information access control unit in Embodiment 3 of the present invention.
FIG. 13 is a flowchart for updating the current location and the previous location regularly by the confidential information access control unit in Embodiment 3 of the present invention.
FIG. 14 is a flowchart for determining access to confidential information in Embodiment 3 of the present invention.
FIG. 15 is a diagram for illustrating a method of protecting confidential information using the current location information.

FIG. 16 is a diagram for illustrating a method of protecting confidential information using the current location information and the previous location information.
FIG. 17 is a configuration diagram of a nurse-carried terminal according to one aspect of the present invention.

DESCRIPTION OF EMBODIMENTS

Figure 17:
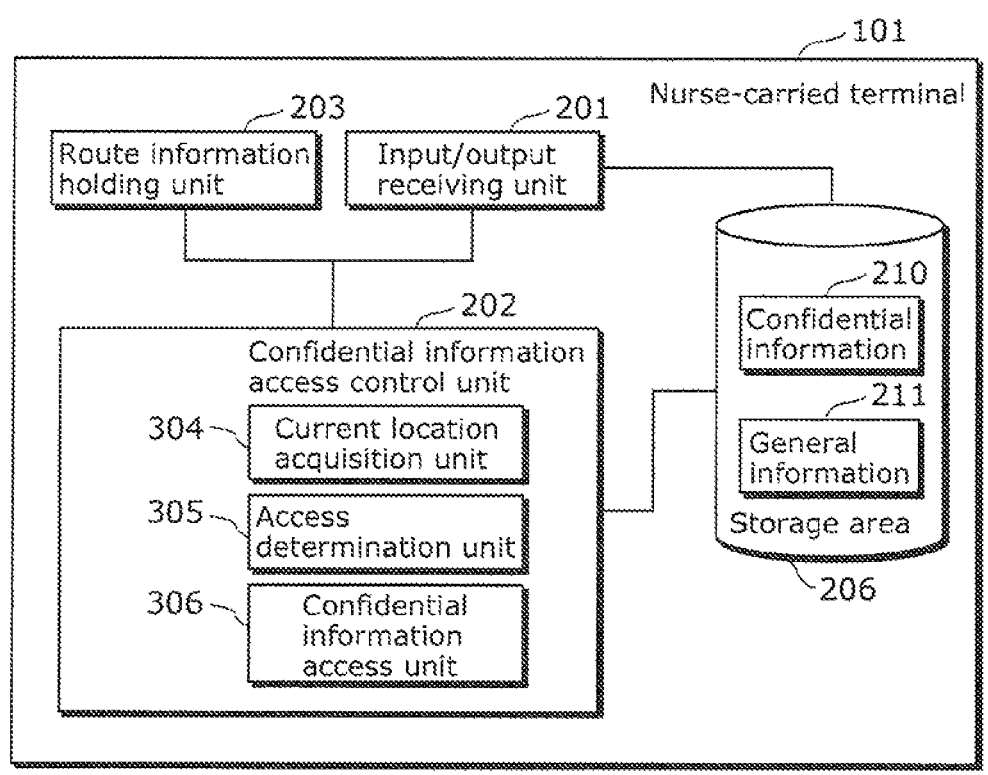
[FIG. 17]

FIG. 17 is a block diagram showing the internal configuration of a nurse-carried terminal (information processing terminal) 101 according to one aspect of the present invention. As shown in FIG. 17, the nurse-carried terminal 101 includes an input/output receiving unit 201, a confidential information access control unit 202, a route information holding unit 203, and a storage area 206 in which confidential information 210 and general information 211 are recorded.

The input/output receiving unit 201 receives from a user an access command (an input command, an output command or the like) to the confidential information 210 and the general information 211 which are recorded in the storage area 206.

The route information holding unit (accessible area holding unit) 203 holds route information (accessible area designation map) indicating the area of activity of the nurse-carried terminal 101. A user who operates the nurse-carried terminal 101 is allowed to access to the confidential information 210 only within the area designated by the accessible area designation map.

The confidential information access control unit 202 determines whether or not access to the confidential information 210 is allowed in response to receiving an access command to the confidential information 210 by the input/output receiving unit 201. Specifically, the confidential information access control unit 202 includes a current location acquisition unit 304, an access determination unit 305, and a confidential information access unit 306.

The current location acquisition unit 304 acquires the current location information indicating the current location of the nurse-carried terminal 101. The access determination unit 305 allows access to the confidential information 210 only when the location of the nurse-carried terminal 101 indicated by the current location information is on the accessible area designation map held in the route information holding unit 203. In response to the allowance of the access by the determination unit 305, the confidential information access unit 306 accesses the confidential information 210 recorded in the storage area 206.

The operation of the nurse-carried terminal 101 in the above-mentioned configuration is described in detail in the following Embodiments 1 to 3. In each of the block diagrams shown in FIG. 2, FIG. 3, FIG. 8, and FIG. 11, the respective blocks corresponding to the blocks shown in FIG. 17 have the same names as those in FIG. 17.

Hereinafter, embodiments of the present invention are described based on the accompanying drawings.
[Embodiment 1]
Hereinafter, a confidential information access control method according to Embodiment 1 of the present invention is described with reference to the drawings.

Figure 1:
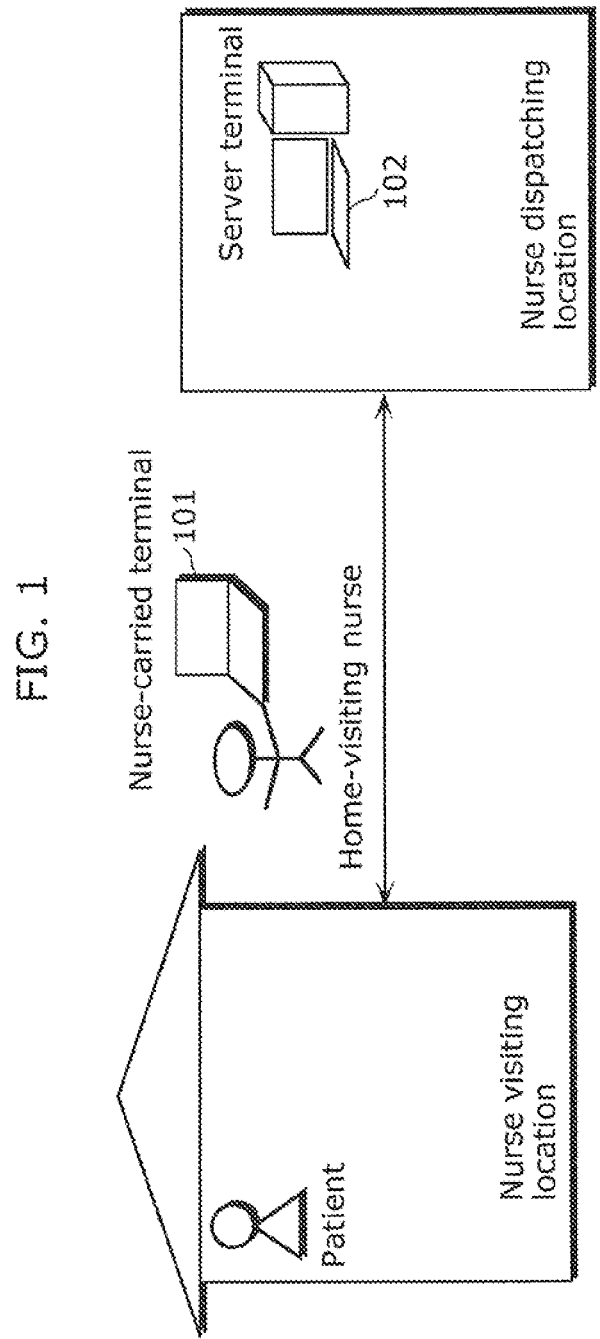
[FIG. 1]

FIG. 1 shows a home visiting nurse dispatch model for which the confidential information access control method according to Embodiment 1 of the present invention is used. In FIG. 1, in the home visiting nurse dispatch model according to Embodiment 1, a home visiting nurse is dispatched from a nurse dispatch location (also simply referred to as "dispatch location") to nurse visit location (also simply referred to as "visit location") where a patient resides. A nurse, when being dispatched, carries the nurse-carried terminal 101.

In addition, the nurse dispatch location is equipped with a server terminal 102. The server terminal 102 generates route information (also referred to as "accessible area designation map") designating the route along which a home visiting nurse follows from the dispatch location to the visit location. Based on the route information, the nurse-carried terminal 101 manages the access to the confidential information 210 on the route of activity from the dispatch location to the visit location. The home visiting nurse downloads the route information to the visit location from the server terminal 102 to the nurse-carried terminal 101 before the visit.

The server terminal 102 also stores the information related to the patient at the visit location. The home visiting nurse may download information from the server terminal 102 to the nurse-carried terminal 101 before the visiting, and after returning from the visit location to the dispatch location, the home visiting nurse may upload information stored in the nurse-carried terminal 101 to the server terminal 102, the information being related to the patient.

Figure 2:
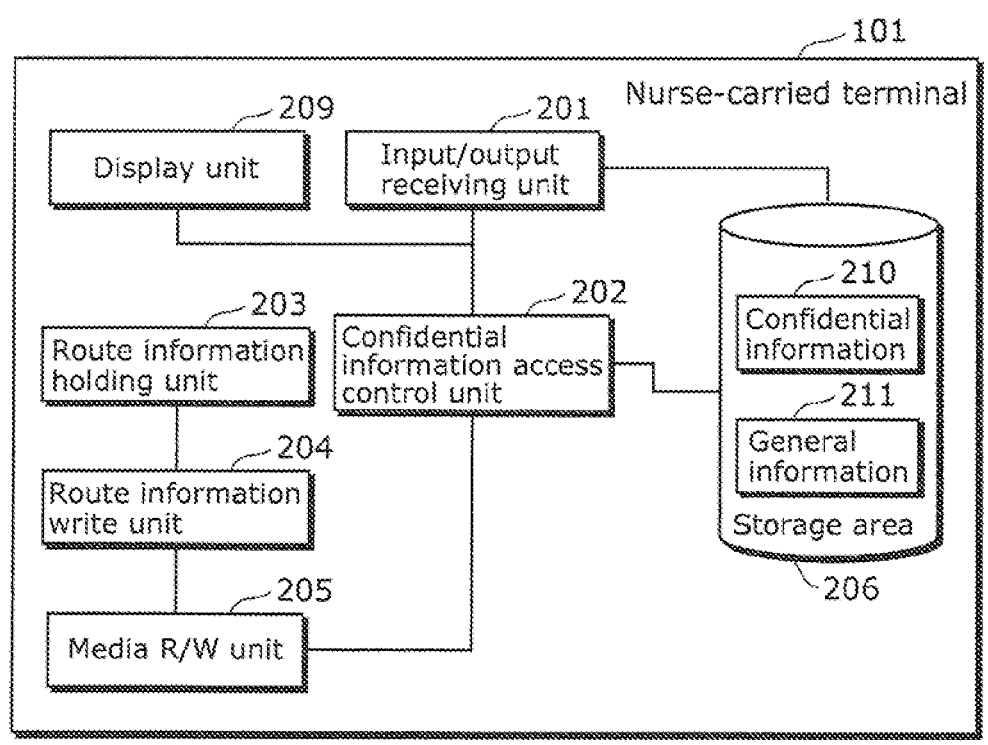
[FIG. 2]

FIG. 2 is a block diagram showing the internal configuration of the nurse-carried terminal 101 according to Embodiment 1 of the present invention. In FIG. 2, the nurse-carried terminal 101 according to Embodiment 1 includes the input/output receiving unit 201, the confidential information access control unit 202, the route information holding unit 203, a route information write unit 204, and a medium R/W (Read/Write) unit 205, the storage area 206 which stores the confidential information 210 and the general information 211, and a display unit 209.

The input/output receiving unit 201 receives an input/output command to the confidential information 210 and/or the general information 211 that are recorded in the storage area 206, from the home visiting nurse as a user. Specifically, the input/output receiving unit 201, when receiving an output command from a user, determines whether the command is to the confidential information 210 or to the general information 211. When the command is to the confidential information 210, the input/output receiving unit 201 transmits an output request to the confidential information access control unit 202. Also, for a command from a user to input new confidential information 210, and a command from a user to modify the existing confidential information 210, the input/output receiving unit 201 transmits an input request to the confidential information access control unit 202.

The confidential information access control unit 202 controls access to the confidential information 210 in the storage area 206. The confidential information access control unit 202, when receiving an input/output request to the confidential information 210 from the input/output receiving unit 201, determines whether or not the access is allowed based on the route information held in the route information holding unit 203. When it is determined that "access is allowed" in the case of an output request, the confidential information 210 is transmitted to the display unit 209. In the case of an input request, write to the new confidential information 210, or modification to the existing confidential information 210 is performed. On the other hand, when it is determined that "access is not allowed", the result of the determination is transmitted to the input/output receiving unit 201. In addition, the confidential information access control unit 202 records the confidential information 210 into a recording medium via the medium R/W unit 205.

The manner in which the confidential information 210 in the storage area 206 is protected is not particularly limited, thus, for example, the confidential information access control unit 202 may encrypt and decrypt the confidential information 210. Alternatively, a special file system may be used only for the confidential information 210, and access may be made by a method different from that for the general information 211. Furthermore, the storage area 206 itself may have an encryption function, and with the function, and the confidential information 210 may be encrypted at the time of input, and may be decrypted at the time of output. Then in this case, the storage area 206 may generate a key, or the confidential information access control unit 202 may generate a key, and may input the key in the storage area 206.

The confidential information access control unit 202 is preferably protected against unauthorized tampering. For example, the protection may be achieved by using the tamper-resistant technology disclosed in WO2004013744A2 (Patent Literature 3), or Reactive Methods disclosed in "TCG Mobile Reference Architecture Specification version 1.0" of TCG (Trusted Computing Group).

The route information holding unit 203 holds the information of a route from the nurse dispatch location to a nurse visit location when a home visiting nurse visits the visit location. The route information holding unit 203 may hold a plurality of pieces of route information for different routes beforehand. And in the case where there occurs a failure such as an accident, the system may be controlled using route information as the second alternative.

The route information write unit 204 reads route information from an recording medium via the medium R/W unit 205, and writes the read route information to the route information holding unit 203. Alternatively, the route information write unit 204 may directly acquire the route information from the server terminal 102 via a communication line or the like, and may write acquired the route information to the route information holding unit 203. The medium R/W unit 205 performs processing of reading the information recorded in the recording medium, and performs processing of writing information to the recording medium. That is to say, the route information write unit 204 and the medium R/W unit 205 serve as an updating unit which updates the content of the route information holding unit 203 with the route information acquired from the outside.

The storage area 206 stores the confidential information 210 and the general information 211. Although the configuration of the storage area 206 is not specifically limited, any kind of data recordable means, for example, DRAM (Dynamic random access memory), SDRAM (Synchronous dynamic random access memory), a flash memory, a ferro-electric memory, or the like may be used.

The display unit 209 displays the transmitted information. Although the configuration of the display unit 209 is not specifically limited, for example, a liquid crystal display, a plasma display, an organic electroluminescence (ElectroLuminescence) display, or the like may be used.

Figure 3:
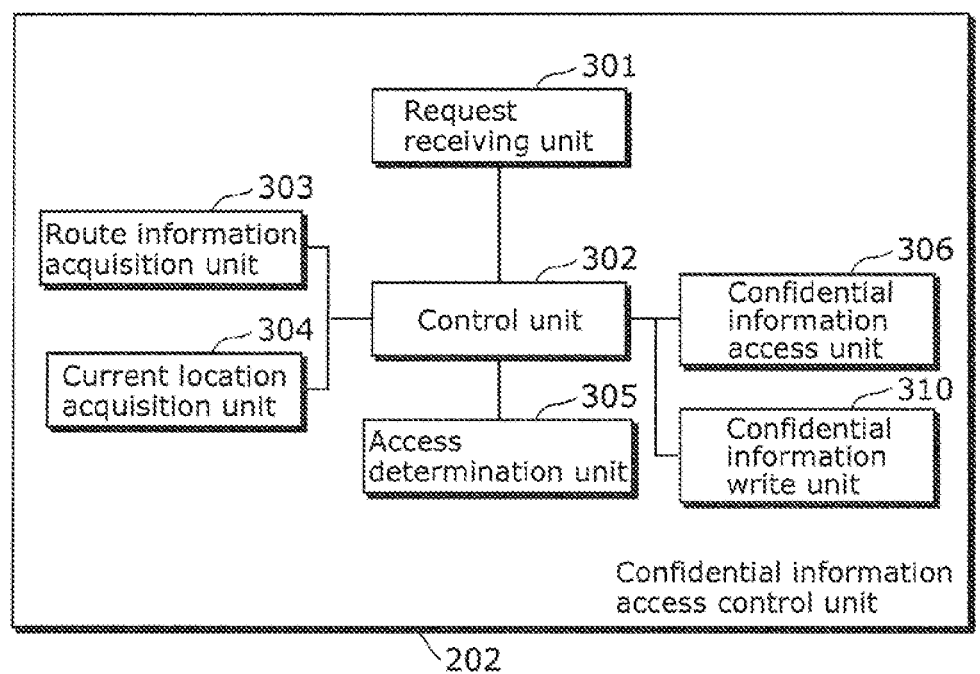
[FIG. 3]

FIG. 3 is a block diagram showing the internal configuration of the confidential information access control unit 202 shown in FIG. 2. In FIG. 3, the confidential information access control unit 202 according to Embodiment 1 includes a request receiving unit 301, a control unit 302, a route information acquisition unit 303, the current location acquisition unit 304, the access determination unit 305, the confidential information access unit 306, and a confidential information write unit 310.

The request receiving unit 301 receives an input/output request from the input/output receiving unit 201, and transmits the input/output request to the control unit 302.

The control unit 302, after receiving an input/output request from the request receiving unit 301, transmits a route information acquisition request to the route information acquisition unit 303, thereby making the route information acquisition unit 303 acquire route information from the route information holding unit 203. In addition, the control unit 302 transmits a current location acquisition request to the current location acquisition unit 304, thereby making the current location acquisition unit 304 acquire the current location information. The control unit 302 then acquires the route information and the current location information from the route information acquisition unit 303 and the current location acquisition unit 304, respectively. The control unit 302, after acquiring the route information and the current location information, transmits these pieces of information to the access determination unit 305 along with an access determination request. The control unit 302 further transmits an access request to the confidential information access unit 306 when the result of the determination received from the access determination unit 305 is "access is allowed." The control unit 302 transmits the confidential information 210 to the confidential information write unit 310 along with a write request to the recording medium.

The route information acquisition unit 303, after receiving a route information acquisition request from the control unit 302, acquires route information from the route information holding unit 203, and transmits the acquired route information to the control unit 302. The route information acquisition unit 303 has a hash value of the route information in order to protect against unauthorized replacement of the route information. Then, hash operation may be performed at the time of acquisition of route information to check the occurrence of such replacement. The hash calculation algorithm used here, is implemented, for example, by HMAC (Keyed-Hashing for Message Authentication) algorithm using an one-way function such as SHA-1 or MD5

More specifically, the route information write unit 204, when writing the route information to the route information holding unit 203, acquires the first hash value by inputting the route information to a predetermined hash function. The first hash value is held by the route information acquisition unit 303 of the confidential information access control unit 202. Next, the route information acquisition unit 303 acquires the second hash value by inputting the route information acquired from the route information holding unit 203 to a predetermined hash function.

The route information acquisition unit 303 then compares the first hash value calculated by the route-information write unit 204 with the second hash value calculated by itself, and may transmit the route information to the control unit 302 only when two hash values are equal. On the other hand, when the first and second hash values are different, the route information acquisition unit 303 determines that the route information has been tampered with, and may transmit an error message to the control unit 302 to terminate the processing.

The current location acquisition unit 304, after receiving a current location acquisition request from the control unit 302, acquires the information (the current location information) indicating the current location of the nurse-carried terminal 101, and transmits the acquired current location information to the control unit 302. The current location information is generally acquired by GPS, however, as long as the current location information can be acquired by a method, the method is not limited to GPS.

The access determination unit 305, after receiving the route information, the current location information, and an access determination request from the control unit 302, determines whether or not the current location indicated by the current location information is on the route shown by the route information. The access determination unit 305 then transmits "access is allowed" when the current location is on the route, or transmits "access is not allowed" when the current location is not on the route.

The confidential information access unit 306, after receiving an access request from the control unit 302, accesses the confidential information 210 recorded in the storage area 206. In the case where the confidential information 210 in the storage area 206 is protected by applying encryption and decryption on the confidential information 210, the confidential information access unit 306 has an encryption and decryption function. On the other hand, in the case where a special file system is used for the confidential information 210, the confidential information access unit 306 accesses the confidential information 210 via the special file system.

The confidential information write unit 310 writes the confidential information 210 to a recording medium in response to an instruction from the control unit 302.

Figure 4:
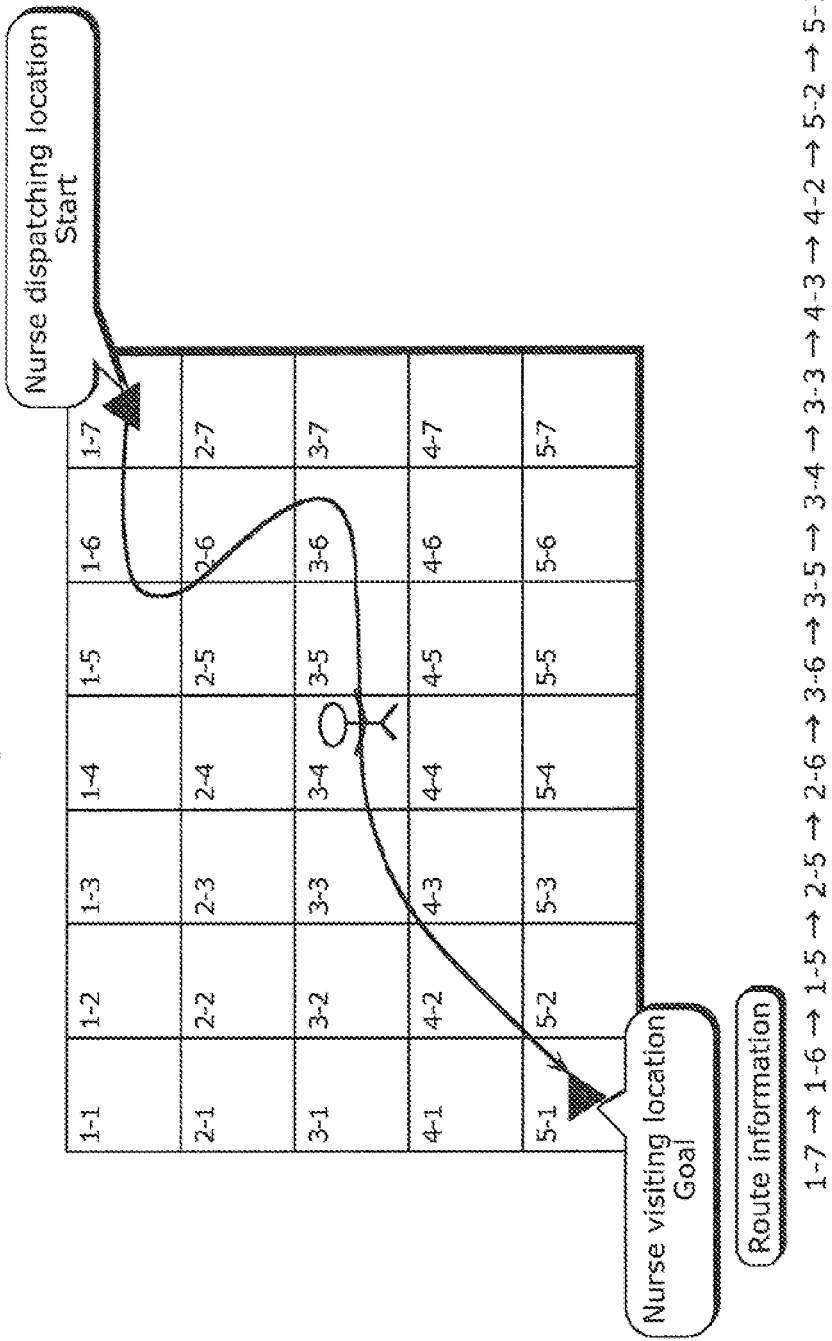
[FIG. 4]

FIG. 4 is a diagram showing the route information held by the route information holding unit 203 shown in FIG. 2.

In FIG. 4, the route information indicates a travel route from a nurse dispatch location to a nurse visit location. The route information is divided into a plurality of sections like "section n-m." In FIG. 4, the nurse dispatch location is expressed by "section 1-7", the nurse visit location is expressed by "section 5-1", and the current location of the home visiting nurse is expressed by "section 3-4." The route information is expressed by a set of "section n-m" without a break in the drawing of the route. The section and the information of GPS are associated with each other, however, the know-how of the association is well known technology in GPS, thus description is omitted.

Hereinafter, the confidential information access control method configured in the above manner is described using the drawings.

Figure 5:
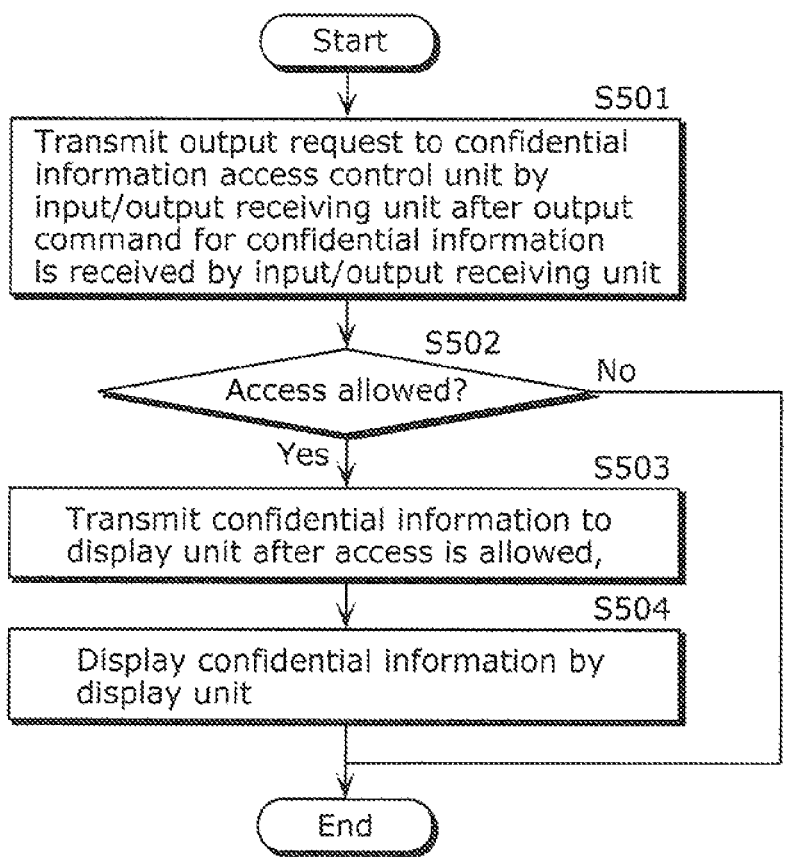
[FIG. 5]

FIG. 5 is a flowchart showing the operation of an access to the confidential information 210 of the nurse-carried terminal 101 by the home visiting nurse located in "section 3-4" shown in FIG. 4. FIG. 5 illustrates the case where the input/output receiving unit 201 receives an "output command." On the other hand, in the case where an "input command" is received, and the determination of "access is allowed" is made, the input/output receiving unit 201 writes new confidential information to the confidential information 210, instead of reading the confidential information 210. The later-described FIG. 6 also follows a similar step.

First, the input/output receiving unit 201, after receiving an output command to the confidential information 210 from the home visiting nurse, transmits an output request to the confidential information access control unit 202 (S501). Next, the confidential information access control unit 202, after receiving an output request for the confidential information 210 from the input/output receiving unit 201, determines whether or not the access is allowed (S502).

Figure 6:
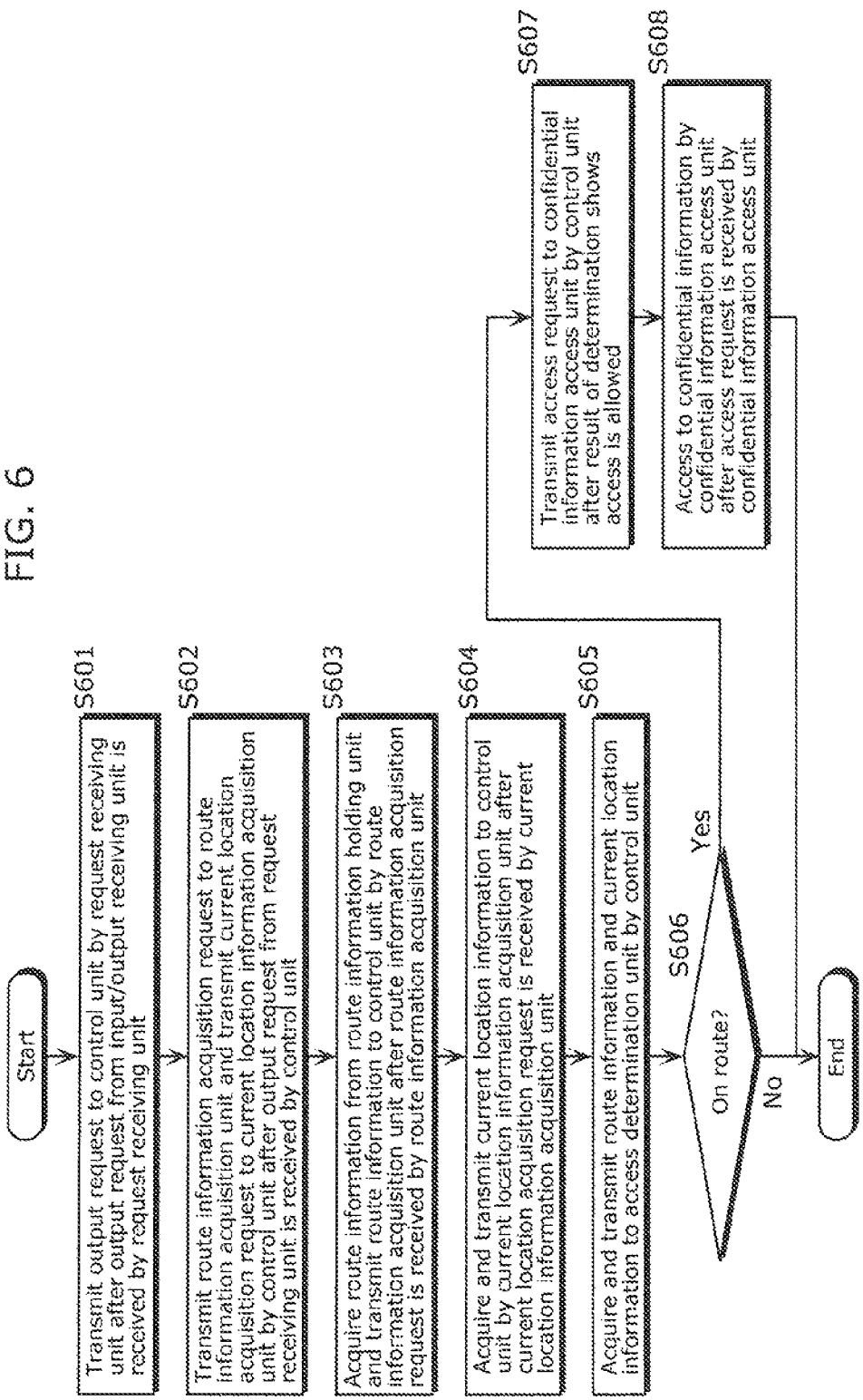
[FIG. 6]

When the result of the determination is "access is allowed" (Yes in S502), the control unit 302 of confidential information access control unit 202 transmits an access request to the confidential information access unit 306 to cause it to access the confidential information 210. The confidential information access unit 306 reads the confidential information 210 from the storage area 206 according to the access request, and transmits the read confidential information 210 to the display unit 209 (S503). The display unit 209, after receiving the confidential information 210 from the confidential information access control unit 202, displays the received confidential information 210 (S504).

in FIG. 6 is a flowchart showing the operation of determining whether or not access is allowed by the confidential information access control unit 202 in S502 of FIG. 5.

The request receiving unit 301 receives an output request from the LS input/output receiving unit 201, and transmits the output request to the control unit 302 (S601).

The control unit 302, after receiving an output request from the request receiving unit 301, transmits a route information acquisition request to the route information acquisition unit 303 to acquire route information from the route information holding unit 203. The control unit 302 also transmits a current location acquisition request to the current location acquisition unit 304 to acquire the location information of the current nurse-carried terminal 101 (S602).

The route information acquisition unit 303, after receiving a route information acquisition request from the control unit 302, acquires route information from the route information holding unit 203, and transmits the acquired route information to the control unit 302 (S603). The current location acquisition unit 304, after receiving a current location acquisition request from the control unit 302, acquires the current location information "section 3-4", and transmits the acquired current location information to the control unit 302 (S604).

The control unit 302 transmits the route information acquired from the route information acquisition unit 303, and the current location information "section 3-4" acquired from the current location acquisition unit 304 to the access determination unit 305 along with an access determination request (S605).

The access determination unit 305 receives the route information, the current location information "section 3-4", and the access determination request from the control unit 302. The access determination unit 305 determines whether or not the current location information "section 3-4" is on the route shown in the route information, and transmits "access is allowed" to the control unit 302 when the current location is on the route, or transmits "access is not allowed" to the control unit 302 when the current location is not on the route (S606).

The control unit 302 receives a result of the determination from the access determination unit 305, and transmits an access request to the confidential information access unit 306 when "access is allowed" (S607). The confidential information access unit 306, after receiving an access request from the control unit 302, accesses the confidential information 210 in the storage area 206 (S608).

Figure 15:
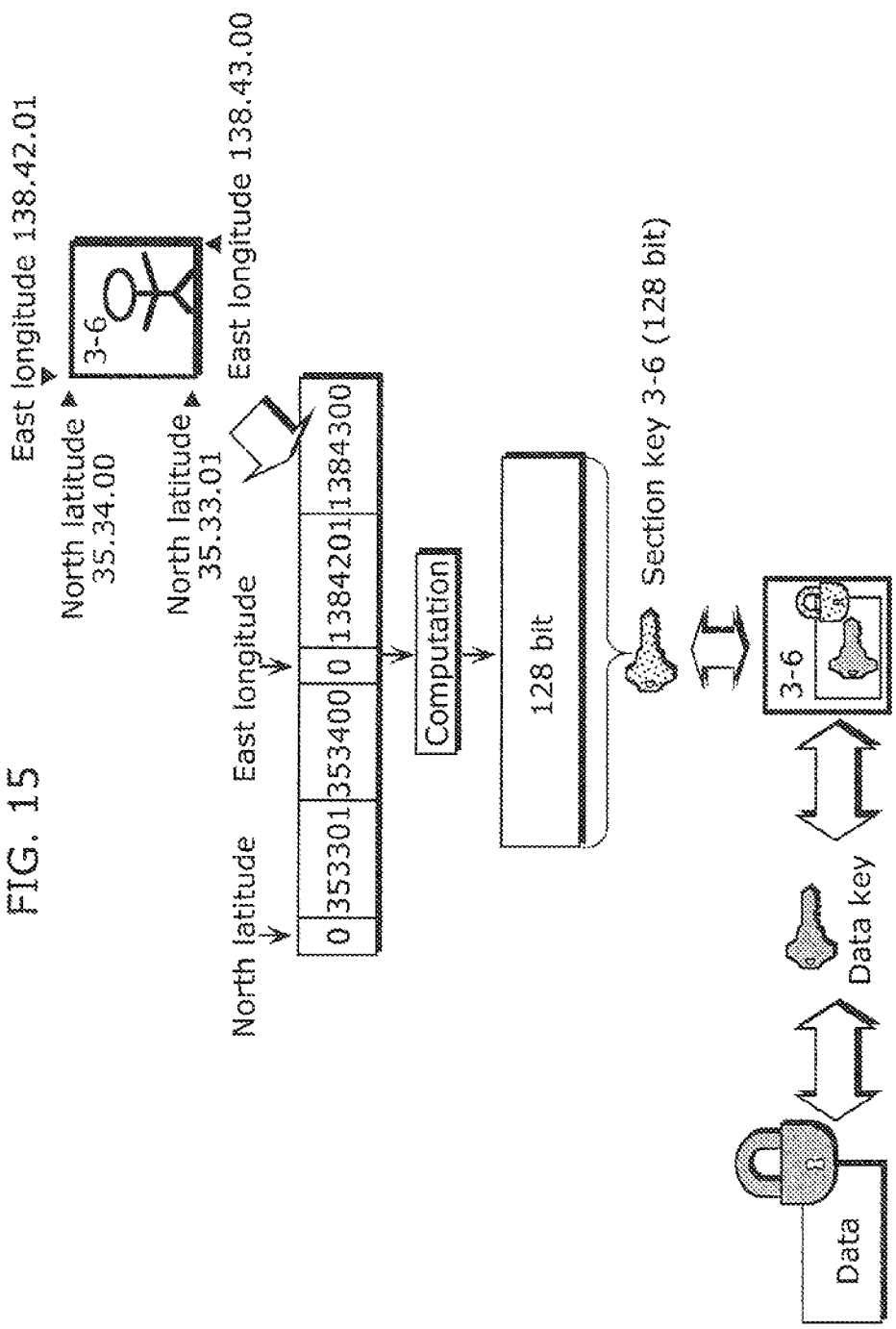
[FIG. 15]

In Embodiment 1, the relationship between the protection of the confidential information 210 and the current location information may be what is illustrated in the schematic diagram of FIG. 15. In the example of FIG. 15, a home visiting nurse who is a user is on the current location information "section 3-6." The "section 3-6" represents the range of 35 deg. 33 min. 01 sec. to 35 deg. 34 min. 00 sec. north latitude, and 138 deg. 42 min. 01 sec. to 138 deg. 43 min. 00 sec. east longitude.

Here, the section key corresponding to "section 3-6" is calculated by applying a predetermined operation to the digit string which is obtained by adding, as shown in FIG. 15, "0" representing the north latitude ("1" representing the south latitude), and "0" representing the east longitude ("1" representing the west longitude) to the digit strings indicating the latitude and longitude of "section 3-6." The section key in this example is a key in accordance with 128-bit AES (Advanced Encryption Standard). The section key corresponding to another section can also be calculated in a similar manner.

Here, the confidential information access unit 306, when writing the confidential information 210 in the storage area 206, encrypts the confidential information 210 with a data key. In addition, the confidential information access unit 306 encrypts the data key that is used for encrypting the confidential information 210, with the section key generated for each section in the above-described manner. The data key which is encrypted (encrypted data key) is, for example, held in the route information holding unit 203 along with the route information.

That is to say, the nurse-carried terminal 101 holds the encrypted data keys of respective sections on the route from the nurse dispatch location (section 1-7 of FIG. 4) to the nurse visit location (section 5-1 of FIG. 4). In the example of FIG. 4, 13 encrypted data keys are held. On the other hand, the encrypted data key of a section (for example, section 1-1) which is outside the route may be held, or may not be held.

Next, the confidential information access unit 306, when reading the confidential information 210 recorded in the storage area 206, decrypts the data key used for encrypting the confidential information 210 with the section key for the section corresponding to the current location information which is acquired by the current location acquisition unit 304.

The operation used here is implemented, for example, by HMAC (Keyed-Hashing for Message Authentication) algorithm using an one-way function such as SHA-1 or MD5.

[Embodiment 2]

Figure 7:
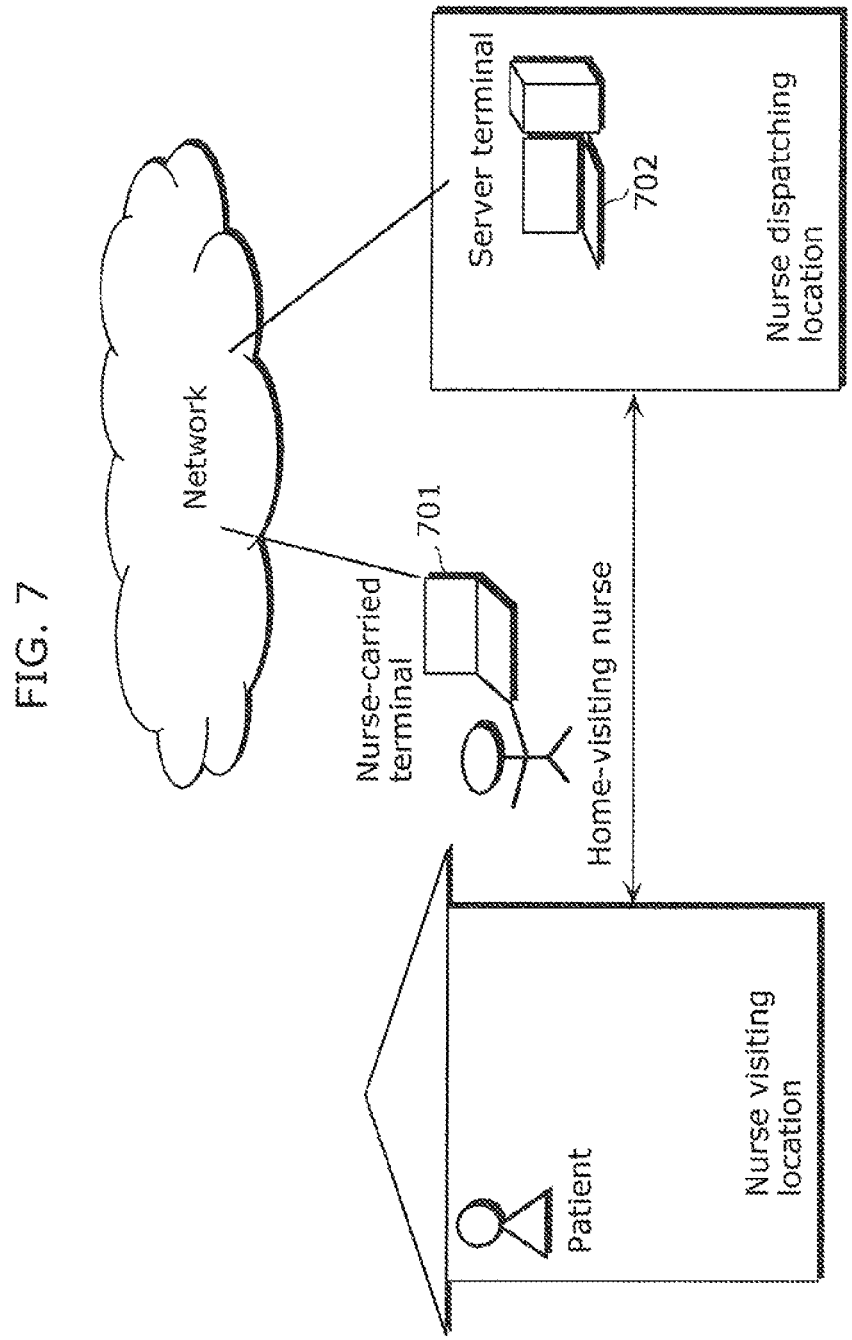
[FIG. 7]

In Embodiment 2, a confidential information access control method to cope with a route change in the middle of the route is described with reference to the drawings. FIG. 7 shows a home visiting nurse dispatch model for which the confidential information access control method according to Embodiment 2 of the present invention is used.

In FIG. 7, the home visiting nurse dispatch model of Embodiment 2 is such that the nurse-carried terminal 701 and the server terminal 702 can communicate with each other via a network to cope with a route change in the middle of the route.

The nurse-carried terminal 701 communicates with the server terminal 702 according to a route information update request from a terminal user. Specifically, the nurse-carried terminal 701 transmits the current location to the server terminal 702, and receives information of new route from the current location to the nurse visit location.

The server terminal 702, after receiving a route information update request and the current location information from the nurse-carried terminal 701, generates information of new route from the current location information to the nurse visit location, while generating encrypted data keys which are encrypted with the respective section keys on the new route. The server terminal 702 then transmits the generated route information and the encrypted data keys to the nurse-carried terminal 701.

Except for those described above, nothing is different from the home visiting nurse dispatch model in FIG. 1, thus description is omitted.

Figure 8:
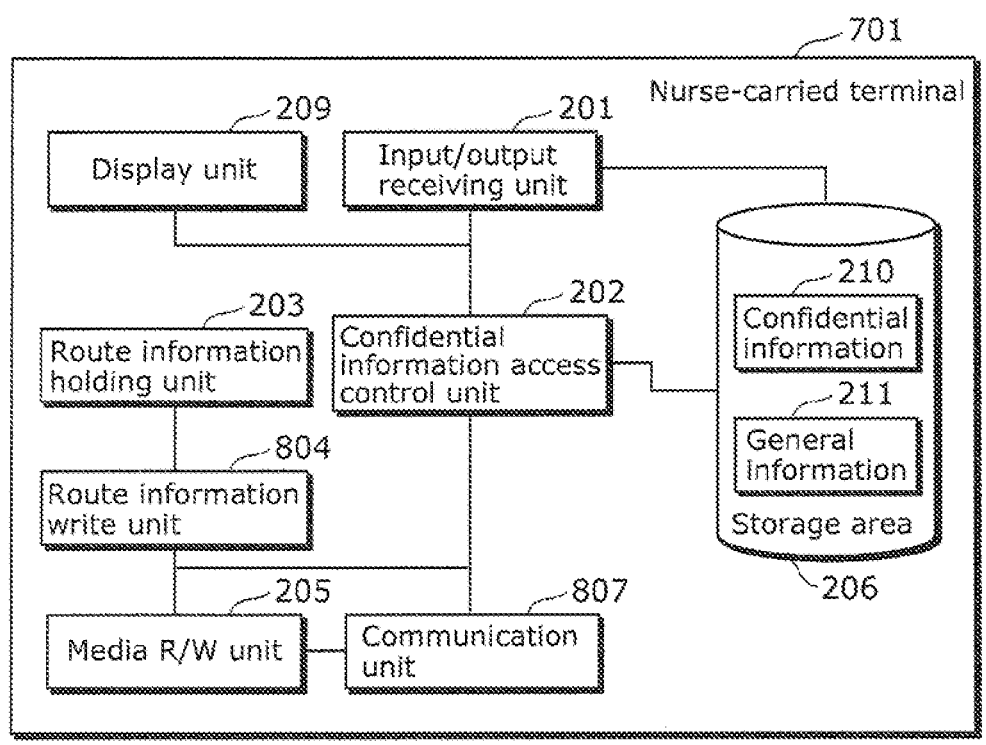
[FIG. 8]

FIG. 8 is a block diagram showing the internal configuration of the nurse-carried terminal 701 according to Embodiment 2 of the present invention. In addition to the configuration of the nurse-carried terminal 101 according to Embodiment 1, the nurse-carried terminal 701 according to Embodiment 2 includes a communication unit 807. The components common to the nurse-carried terminals 101 and 701 are labeled with the same reference numbers, and detailed description is omitted.

The route information write unit 804 acquires new route information from the server terminal 702 via the medium R/W unit 205 and the communication unit 807, and writes the acquired route information to the route information holding unit 203.

The communication unit 807 communicates with server terminal 702 according to a route information update request from a terminal user (typically, a home visiting nurse) which is not shown. Specifically, the communication unit 807 transmits a route information update request and the current location information to the server terminal 702, and receives new route information from the current location to the nurse visit location, and the encrypted data keys corresponding to the respective sections on the route. The communication unit 807 then transmits new route information and encrypted data keys to the route information write unit 804 along with a write request.

Except for those described above, nothing is, different from the home visiting nurse dispatch model in FIG. 1, thus description is omitted.

Figure 9:
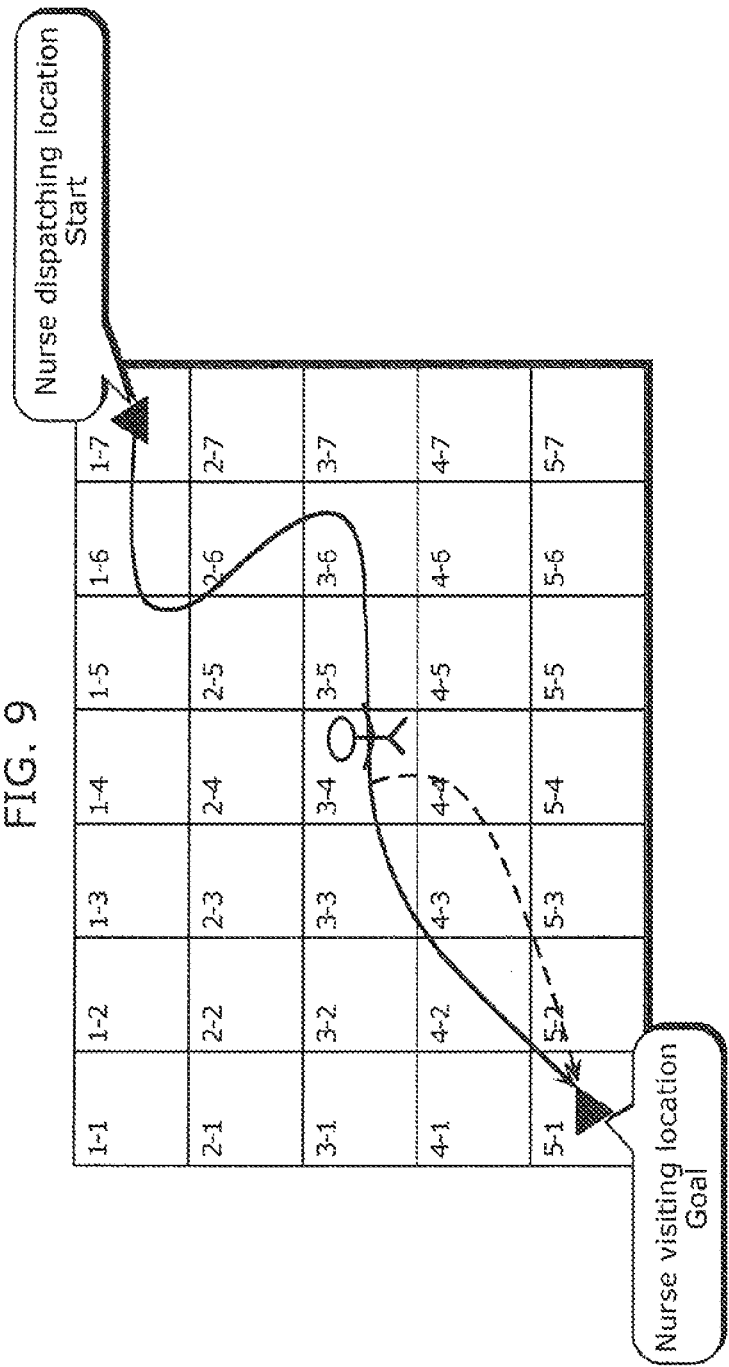
[FIG. 9]

FIG. 9 is a diagram showing the route information (solid line) shown in FIG. 4 and updated new route information (dashed line) according to the route information update request from the nurse-carried terminal 701. In FIG. 9, the route information subsequent to "section 3-4" is newly generated by the server terminal 702 according to the route information update request from the nurse-carried terminal 701.

Hereinafter, the confidential information access control method configured in the above manner to cope with a route change in the middle of the route is described with reference to the drawings.

Figure 10:
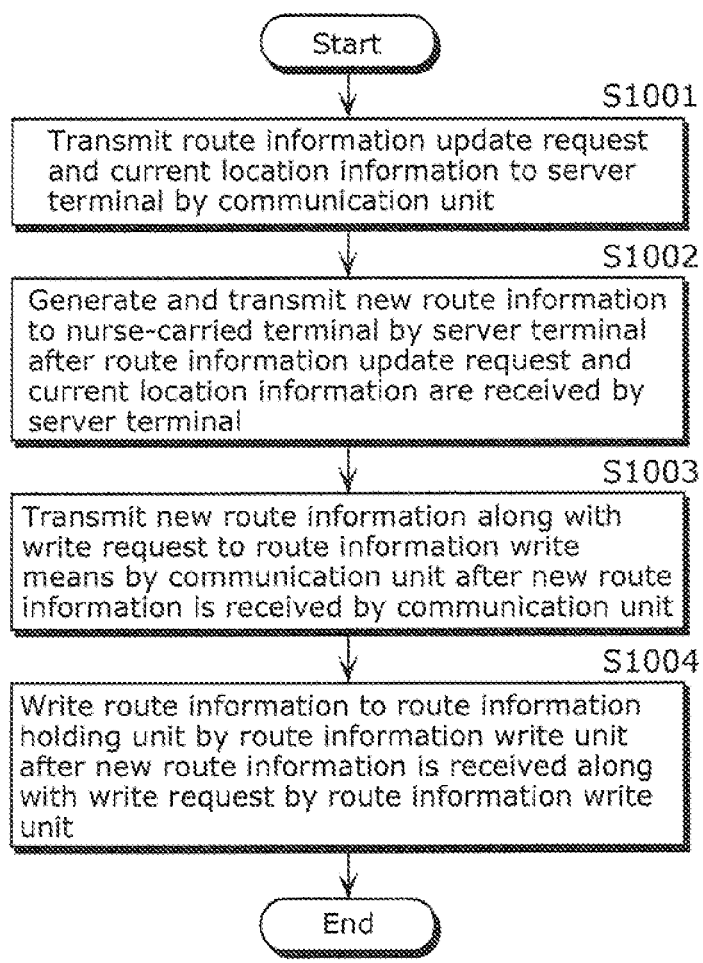
[FIG. 10]

FIG. 10 is a flowchart showing the procedure of updating from the route information shown in FIG. 4 to the route information (dashed line) shown in FIG. 9.

The communication unit 807 transmits a route information update request and the current location information to the server terminal 702 according to a route information update request from a terminal user (S1001). The server terminal 702, after receiving a route information update request and the current location information from the nurse-carried terminal 701, generates new route information from the current location information to the nurse visit location, and the encrypted data keys corresponding to the respective sections on the new route, and transmits the new route information and the encrypted data keys to the nurse-carried terminal 701 (S1002). In the example of FIG. 9, the section "4-4", the section "4-3", and the section "5-2", and the encrypted data keys encrypted with the respective section keys are generated.

The communication unit 807, after receiving new route information from the server terminal 702, transmits the received new route information and encrypted data keys to the route information write unit 804 along with a write request (S1003). The route information write unit 804, after acquiring the new route information and the encrypted data keys from the communication unit 807 along with the write request, writes the received route information and the encrypted data keys to the route information holding unit 203 (S1004).

[Embodiment 3]

In Embodiment 3, a confidential information access control method which uses the current location information and the immediately preceding location information is described with reference to the drawings.

Figure 11:
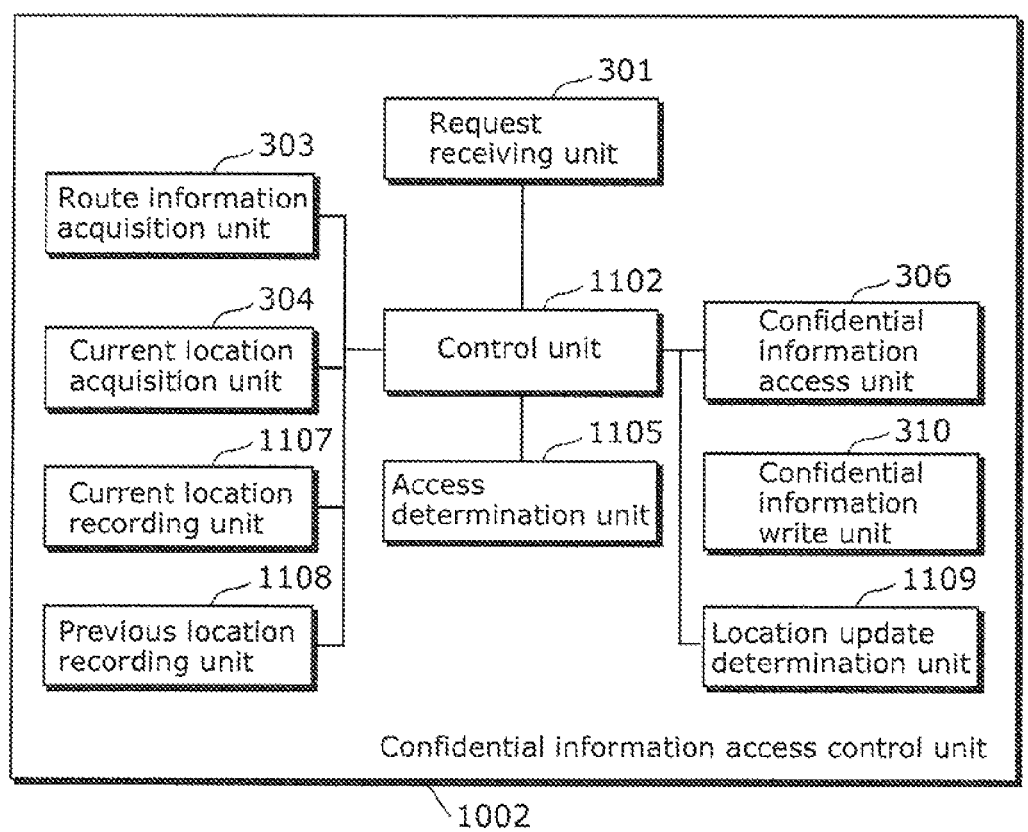
[FIG. 11]

FIG. 11 is a block diagram showing the internal configuration of a confidential information access control unit 1002 in a nurse-carried terminal according to Embodiment 3 of the present invention. The components common to the confidential information access control unit 202 shown in FIG. 3 are labeled with the same reference numbers, and detailed description is omitted. In addition, other components of the nurse-carried terminal are common to the nurse-carried terminal 101 shown in FIG. 2, or the nurse-carried terminal 701 shown in FIG. 8, thus detailed description is omitted.

At the time of power-on of the nurse-carried terminal, the control unit 1102 transmits a current location acquisition request to the current location acquisition unit 304 to acquire the current location information. The control unit 1102 then acquires the current location information from the current location acquisition unit 304, and records the acquired current location information, as regular current location information, in the current location recording unit 1107.

After the power-on of the nurse-carried terminal, the control unit 1102 transmits a route information acquisition request regularly to the route information acquisition unit 303 to acquire route information from the route information holding unit 203, while transmitting a current location acquisition request to the current location acquisition unit 304 regularly to acquire the current location information.

Next, the control unit 1102 acquires route information from the route information acquisition unit 303, and the current location information from the current location acquisition unit 304, while acquiring regular current location information from the current location recording unit 1107, and transmits all these pieces of information to the location update determination unit 1109 along with a location update determination request.

The control unit 1102 then receives a determination result from the location update determination unit 1109. When the received determination result shows "location update needed", the control unit 1102 records the regular current location information, as the previous location information, in the previous location recording unit 1108, and records the current location information, as the regular current location information, in the current location recording unit 1107. That is to say, the control unit 1102 overwrites the content of the previous location recording unit 1108 with the location information recorded in the current location recording unit 1107, and overwrites the content of the current location recording unit 1107 with the to location information acquired from the current location acquisition unit 304.

The control unit 1102, after receiving an input/output request from the request receiving unit 301, transmits a route information acquisition request to the route information acquisition unit 303 to acquire route information from the route information holding unit 203. The control unit 1102 also transmits a current location acquisition request to the current location acquisition unit 304 to acquire the current location information. The control unit 1102 further acquires route information from the route information acquisition unit 303, and the current location information from the current location acquisition unit 304, while acquiring the previous location information from the previous location recording unit 1108.

Next, the control unit 1102 transmits an access determination request to the access determination unit 1105 along with the acquired route information, current location information, and previous location information. The control unit 1102 then receives a determination result from the access determination unit 1105, and transmits an access request to the confidential information access unit 306 when the determination result shows "access is allowed."

The access determination unit 1105 receives an access determination request from the control unit 1102 along with the route information, the current location information, and the previous location information. The access determination unit 1105 determines whether or not the current location indicated by the current location information, and previous location indicated by the previous location information are on the route as shown in the route information, and are the sections adjacent to each other (preceding and subsequent) on the route. The access determination unit 1105 then transmits "access is allowed" to the control unit 1102 when all the above conditions are satisfied, or transmits "access is not allowed" to the control unit 1102 when any one of the above conditions is not satisfied.

The current location recording unit 1107 is initialized by the control unit 1102, and has regular current location information recorded, which is updated as needed. The previous location recording unit 1108 has the previous location information recorded, which is updated by the control unit 1102 as needed.

The location update determination unit 1109 receives a location update determination request from the control unit 1102 along with the route information, the current location information, and the regular current location information. The location update determination unit 1109 transmits "location update needed" to the control unit 1102 when the sections indicated by the current location information and the regular current location information are different in the route information.

Figure 12:
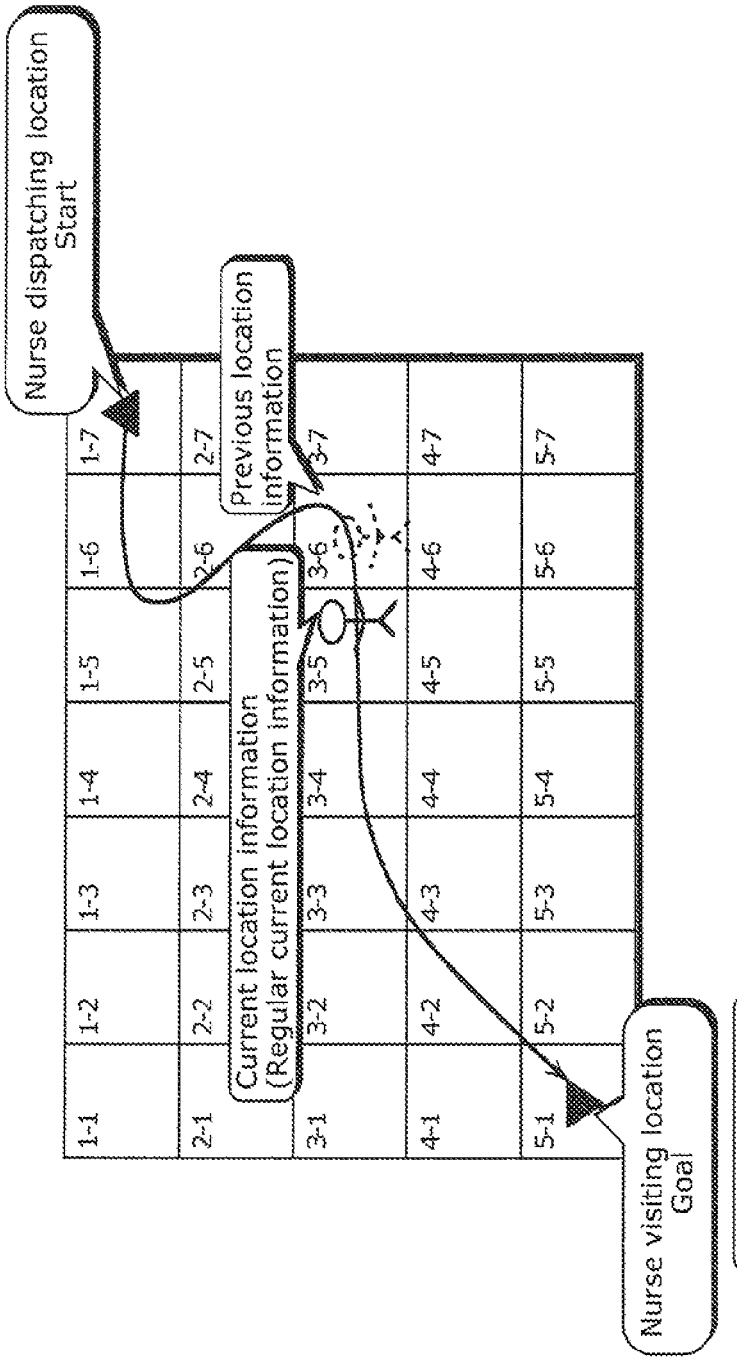
[FIG. 12]

FIG. 12 is a diagram showing previous location information, regular current location information, and the current location information in route information. In FIG. 12, the section indicated by the previous location information is "section 3-6", and the section indicated by the regular current location information and the current location information is "section 3-5." Normally, the regular current location information and the current location information indicate the same section.

Hereinafter, the confidential information access control method configured in the above manner, which uses the current location information and the immediately preceding location information is described with reference to the drawings.

Figure 13:
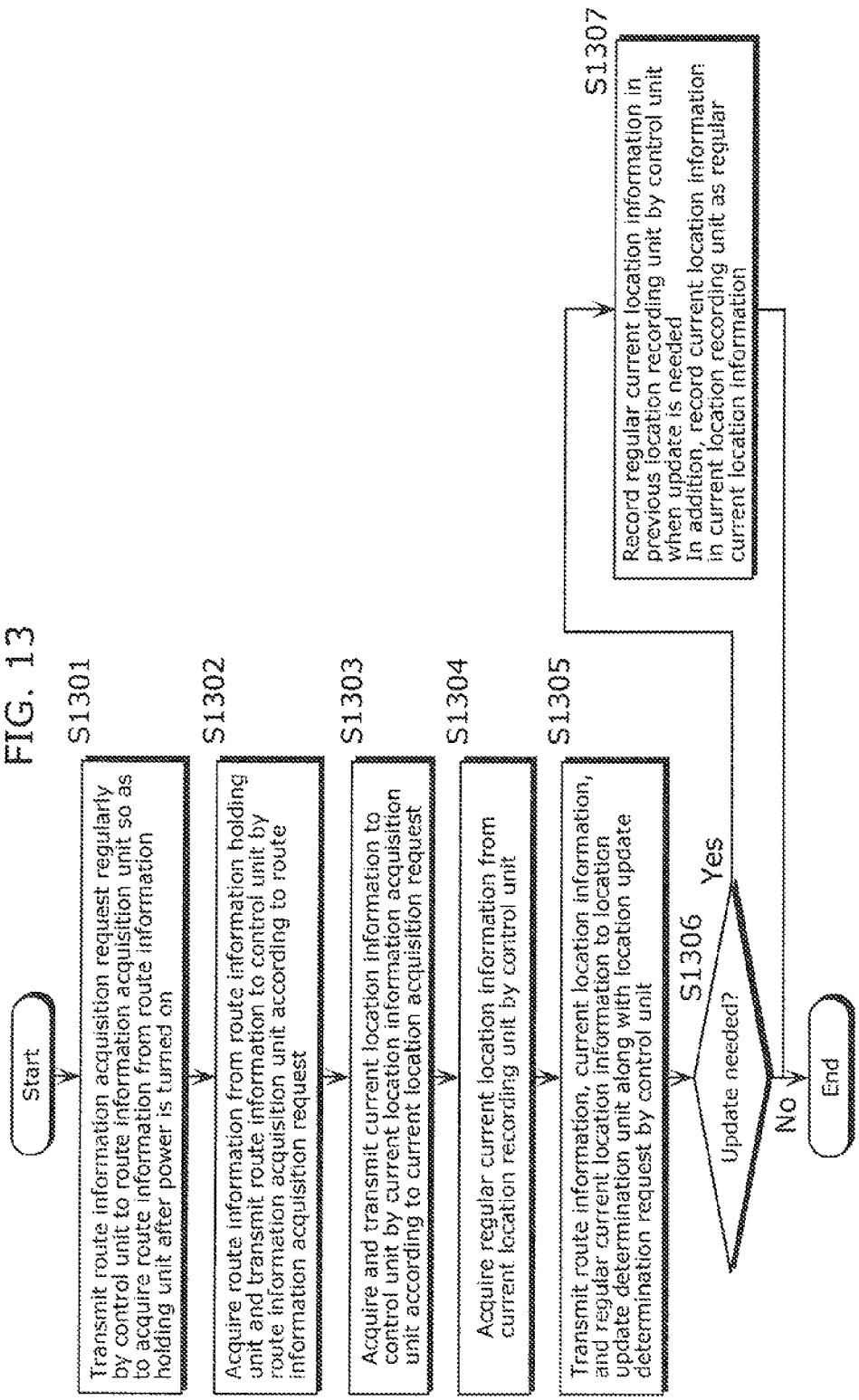
[FIG. 13]

FIG. 13 is a flowchart showing the operation of updating the current location recording unit 1107 and the previous location recording unit 1108 by the confidential information access control unit 1002 shown in FIG. 11. In the following description, it is assumed that the section indicated by the previous location information is "section 2-6", the section indicated by regular current location information is "section 3-6", and a home visiting nurse carrying the nurse-carried terminal 101 is in "section 3-5."

After the power-on of the nurse-carried terminal, the control unit 1102 transmits a route information acquisition request regularly to the route information acquisition unit 303 to acquire route information from the route information holding unit 203, while transmitting a current location acquisition request to the current location acquisition unit 304 to acquire the current location information (S1301).

The route information acquisition unit 303, after receiving a route information acquisition request from the control unit 302, acquires route information from the route information holding unit 203, and transmits the route information to the control unit 302 (S1302). The current location acquisition unit 304, after receiving a current location acquisition request from the control unit 302, acquires the current location information "section 3-5", and transmits the current location information to the control unit 302 (S1303).

The control unit 1102 acquires route information from the route information acquisition unit 303, and the current location information from the current location acquisition unit 304, while acquiring the regular current location information "section 3-6" from the current location recording unit 1107 (S1304). The control unit 1102 then transmits a location update determination request to the location update determination unit 1109 along with the acquired route information, the current location information "section 3-5", and the regular current location information "section 3-6" (S1305).

The location update determination unit 1109 receives a location update determination request from the control unit 1102 along with the route information, the current location information "section 3-5", and the regular current location information "section 3-6." The location update determination unit 1109 transmits "location update needed" to the control unit 1102 when the current location information "section 3-5", and the regular current location information "section 3-6" are different sections on the route information (S1306).

The control unit 1102 receives a determination result from the location update determination unit 1109. Then, in the case of "location update needed" (Yes in S1306), the control unit 1102 records the regular current location information "section 3-6", as the previous location information, in the previous location recording unit 1108, and records the current location information "section 3-5", as the regular current location information, in the current location recording unit 1107 (S1307). Consequently, updated state is as shown in FIG. 12.

The frequency of the processing indicated in FIG. 13 is not particularly limited, however, the above processing needs to be performed, at least, in a time interval sufficiently shorter than the time interval required for the home visiting nurse carrying the nurse-carried terminal 101 to pass through one section.

Figure 14:
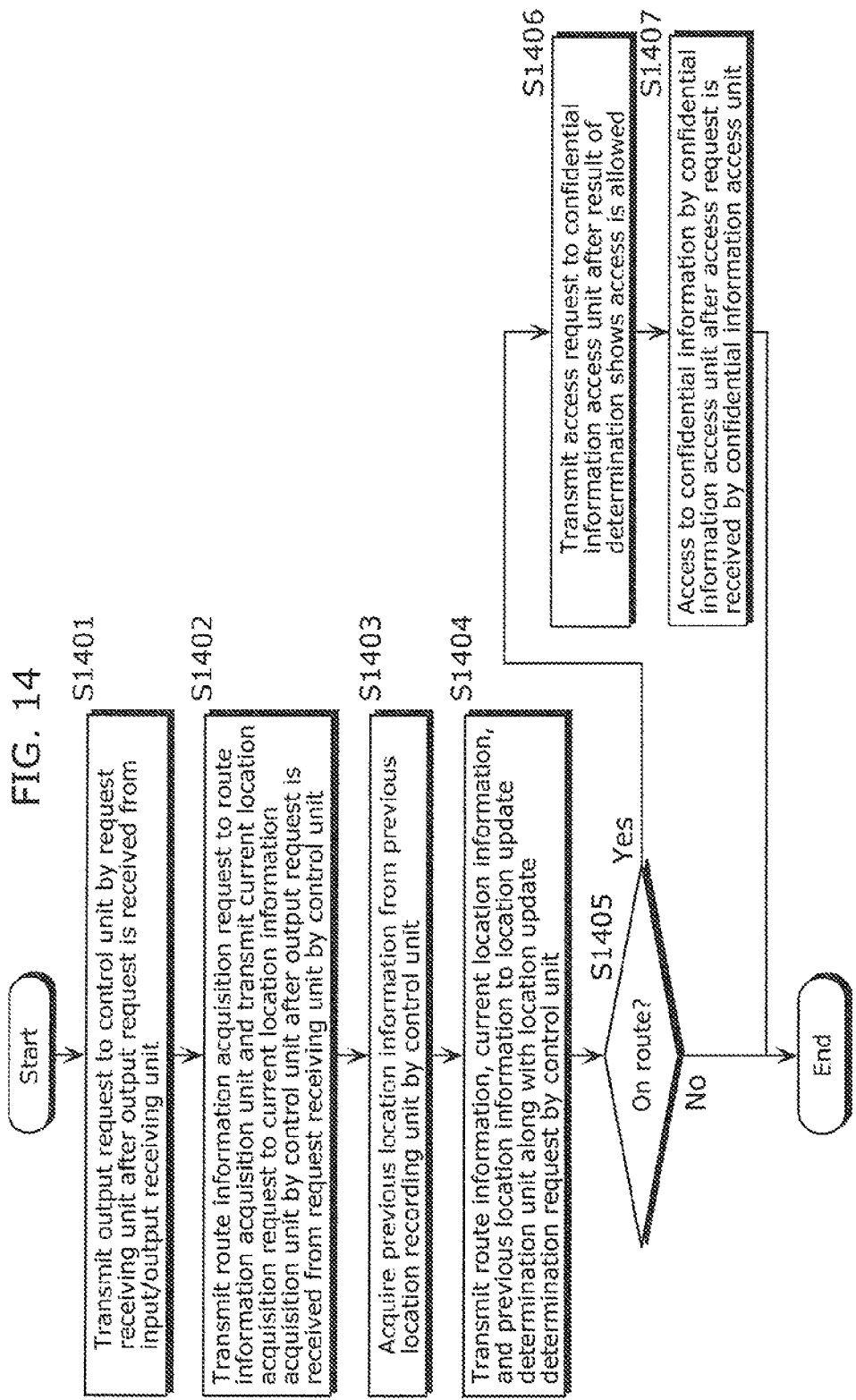
[FIG. 14]

FIG. 14 is a flowchart showing the operation of determining whether or not access is allowed by the confidential information access control unit 202 shown in FIG. 11, in S502 of FIG. 5. In the following as description, it is assumed that by the operation stated in FIG. 13, "section 3-6" has been recorded in the previous location recording unit 1108 and "section 3-5" has been recorded in the current location recording unit 1107 as shown in FIG. 12.

The request receiving unit 301 transmits the output request received from the input/output receiving unit 201 to the control unit 1102 (S1401). The control unit 1102, after receiving the output request from the request receiving unit 301, transmits a route information acquisition request to the route information acquisition unit 303 to acquire route information from the route information holding unit 203, while transmitting a current location acquisition request to the current location acquisition unit 304 to acquire the current location information (S1402).

The route information acquisition unit 303, after receiving a route information acquisition request from control unit 302, acquires route information from the route information holding unit 203, and transmits the route information to the control unit 302. The current location acquisition unit 304, after receiving a current location acquisition request from the control unit 302, acquires and transmits the current location information "section 3-5" to the control unit 1102.

The control unit 1102 acquires route information from the route information acquisition unit 303, and the current location information "section 3-5" from the current location acquisition unit 304, while acquiring the previous location information "section 3-6" from the previous location recording unit 1108 (S1403). The control unit 1102 then transmits an access determination request to the access determination unit 305 along with the acquired route information, current location information "section 3-5", and previous location information "section 3-6" (S1404).

The access determination unit 1105 receives an access determination request from the control unit 1102 along with the route information, the current location information "section 3-5", and the previous location information "section 3-6." The access determination unit 1105 determines whether or not the current location information "section 3-5", and previous location information "section 3-6" are on the route as shown in the route information, and are the sections adjacent to each other (preceding and subsequent) on the route. The access determination unit 1105 then transmits "access is allowed" to the control unit 1102 when all the above conditions are satisfied, or transmits "access is not allowed" to the control unit 1102 when any one of the above conditions is not satisfied (S1405).

The control unit 1102 receives a determination result from the access determination unit 1105. Then, in the case of "access is allowed" (Yes in S1405), the control unit 1102 transmits an access request to the confidential information access unit 306 (S1406). The confidential information access unit 306, after receiving the access request from control unit 1102, makes access to the confidential information 210 recorded in the storage area 206 (S1407).

Figure 16:
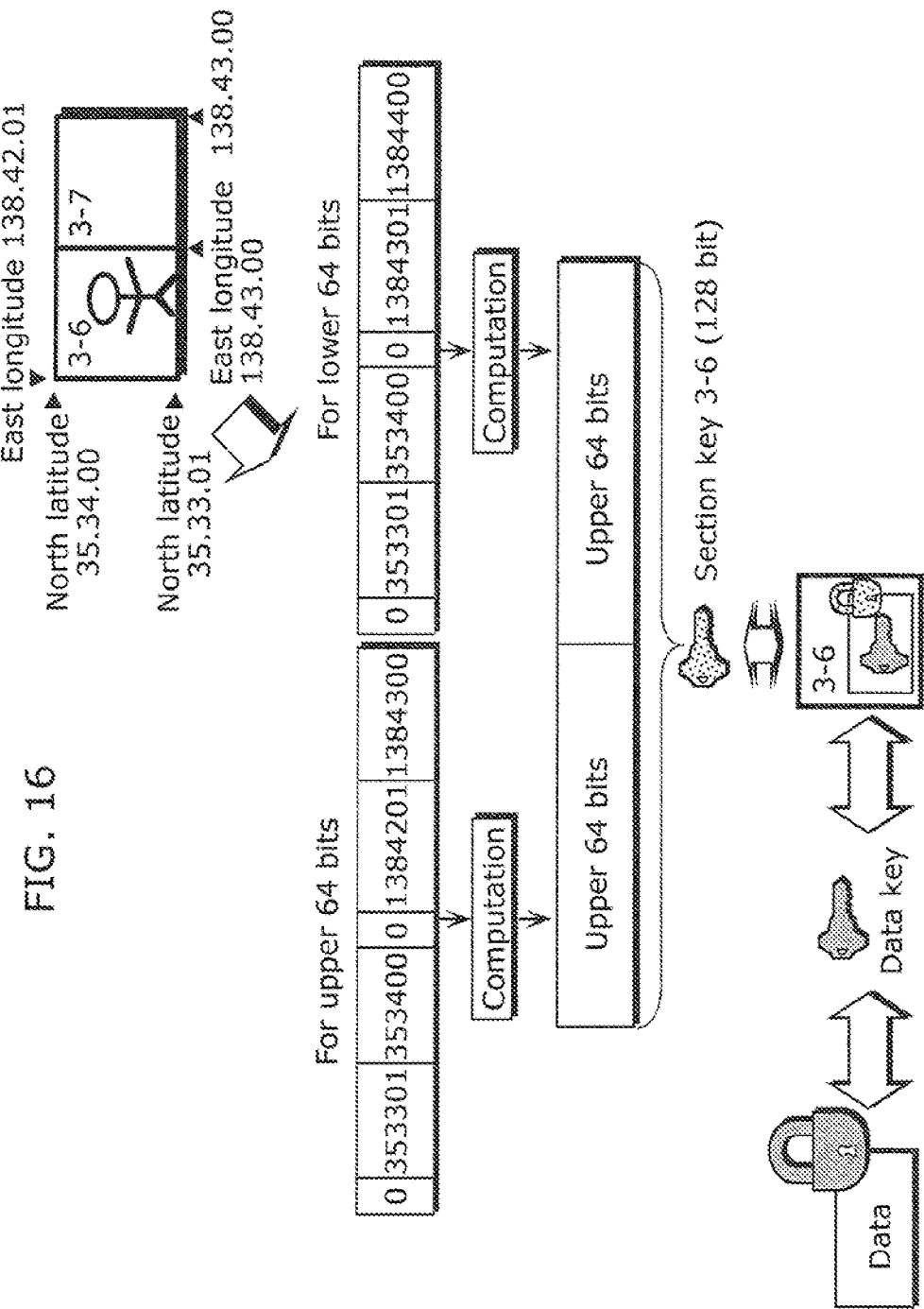
[FIG. 16]

In Embodiment 3, the relationship between the protection of the confidential information 210 and the current location information may be what is illustrated in the schematic diagram of FIG. 16. Compared with the example shown in FIG. 15, the example shown in FIG. 16 has a different method of generating a section key, and other features are common.

In the example of FIG. 16, the home-visiting nurse who is a user is in the current location information "section 3-6." The "section 3-6" represents the range of 35 deg. 33 min. 01 sec. to 35 deg. 34 min. 00 sec. north latitude, and 138 deg. 42 min. 01 sec. to 138 deg. 43 min. 00 sec. east longitude. Last time which is the section required just before that, location information is "section 3-7", and is the scope for 44 minutes and 01 to [138 degrees 43 minutes east] 00 seconds for 34 minutes and 00 seconds from 35 degrees 33 minutes north 01 seconds.

Here, the section key corresponding to "section 3-6" is calculated by applying a predetermined operation to the digit string which is obtained by adding, as shown in FIG. 16, "0" representing the north latitude ("1" representing the south latitude), and "0" representing the east longitude ("1" representing the west longitude) to the digit strings indicating the latitude and longitude, of "section 3-6" so that upper 64 bits are calculated. By applying the same operation to the digit strings indicating the latitude and longitude of "section 3-7", lower 64 bits are calculated. Now, by adding together the upper 64 bits and the lower 64 bits which have been calculated in the above-described manner, 128-bit AES (Advanced Encryption Standard) key corresponding to "section 3-6" is calculated.

By using this key, the data key used for encrypting the confidential information 210 is decrypted, and access to the confidential information 210 is made. The operation used here is implemented, for example, by HMAC (Keyed-Hashing for Message Authentication) algorithm using an one-way function such as SHA-1 or MD5.

[Other Modifications]

A GPS is used for the acquisition of the current location information, however, a gyro sensor or an accelerometer may be used in addition to a GPS. Even in a road environment such as a tunnel where a GPS cannot be used effectively, the current location information can be acquired.

The current location information can be expressed by the longitude and the latitude which have been converted from the data obtained by a GPS, however, the altitude may be added to the current location information as a parameter.

Because acquisition of the current location information using a GPS is accompanied by an error from the actual location information, thus, for example, the location information may be controlled within a tolerance of the order of +10 m.

The display unit may be configured to display route information for which access to the confidential information is allowed. The sections of route information may be shown at the time of display, and the current location and the route so far may be displayed.

The access to the confidential information has been controlled using the location information, however, arrival time information for each section in addition to the location information may be used for the control.

In the case where it is determined that access is allowed once, and later the current location information could not be acquired for a certain period of time, thus determination related to access cannot be made, data may be deleted automatically and the access may not be allowed.

In the case where the information processing terminal is almost off the route which is indicated by the route information, a warning may be presented to a user. Otherwise, in the case where it is determined that the information processing terminal is completely off the route, prohibition of access may be presented to a user.

In the case where the information processing terminal is off the route which is indicated by the route information, access control may be performed not only over "display allowed/not allowed", but also over "read and write allowed/not allowed", "read only allowed/not allowed", and "output to external medium allowed/not allowed."

The configuration can be made such that when the information processing terminal is carried from a starting point to a destination point and is returned to the starting point again, a route log for all routes may be stored so that each route can be checked via the server terminal.

The configuration can be made such that access is allowed in the case where the information processing terminal has been off the route once, but back to the route again without the route information being updated. In this configuration, the number of event of being off the route may be recorded and, the configuration can be made such that access is not allowed in the case where the number is greater than or equal to a predetermined number.

The information processing terminal may be provided with a car-navigation system, and the information of route from a starting point to an arrival point is calculated, then an inquiry to the server is made via a network, so that permission of access to the confidential information may be granted on the route of the route information. In this configuration, for the update of the route information, the car-navigation system may calculate route information to the arrival point based on the current location information, so that permission of access may be granted from the server.

It is assumed that "access is allowed" on the route in the route information, however, access control can be made such that "access is not allowed" only on the route.

When a plurality of information processing terminals are managed by the server side, specific ID may be assigned to each information processing terminal for the management.

Specifically, each device described above is a computer system including a microprocessor, a ROM, a RAM, a hard disk unit, a display unit, a keyboard, a mouse, and the like. In the RAM or the hard disk unit, a computer program is recorded. Each device achieves its function by an operation of the microprocessor in accordance with the computer program. Here, the computer program is constituted by a plurality of combined command codes designating a command to a computer in order to achieve a predetermined function. Each device is not limited to a computer system that includes all of a microprocessor, a ROM, a RAM, a hard disk unit, a display unit, a keyboard, and a mouse, but may be a computer system that is constituted by a part of these components.

Part or all of the components constituting each device described above may be constituted by one system LSI (Large Scale Integration: Large-scale integrated circuit). The system LSI is a super-multifunctional LSI which is manufactured by integrating a plurality of constituting parts on a single chip, and specifically, is a computer system including a microprocessor, a ROM, a RAM, and the like. In the RAM, a computer program is recorded. The system LSI achieves its function by an operation of the microprocessor in accordance with the computer program. In addition, each part of the components constituting each device described above may be individually implemented as a single chip, or a single chip may includes part or all of the components. Here, the relevant part or all of the components is referred to as LSI, however, may be referred to as IC, LSI, super LSI, or Ultra LSI depending on the degree of integration. Alternatively, the technique for circuit integration is not limited to LSI, but the circuit integration may be achieved with a dedicated circuit or a general-purpose processor. FPGA (Field Programmable Gate Array) which can be programmed after an LSI is manufactured, or a reconfigurable processor for which connection and setup of the circuit cells inside an LSI can be reconfigured may be utilized. Furthermore, in the case where new technology of circuit integration which replaces the LSI is invented due to the progress of semiconductor technology or other emerging technology, naturally, a functional block may be integrated using the technology. Application of biotechnology may have such potential.

Part or all of the components constituting each device described above may be configured with an IC card or a single module which is detachably attached to each device. The IC card or the module is a computer system including a microprocessor, a ROM, a RAM, and the like. The IC card or the module may include the above-mentioned super-multifunctional LSI. The IC card or the module achieves its function by an operation of the microprocessor in accordance with the computer program. The IC card or the module may have tamper-resistance.

The present invention may be a method described above. In addition, the invention may be a computer program which achieves these methods by a computer, or may be a digital signal including the computer program. In addition, the present invention may be a computer-readable recording medium, for example, a flexible disk, a hard disk, a CD-ROM, an MO, a DVD, a DVD-ROM, a DVD-RAM, a BD (Blu-ray Disc), a semiconductor memory, or the like, in which the computer program or the digital signal is recorded. In addition, the present invention may be the digital signal recorded in one of these recording media. In addition, the present invention may be transmission in which the computer program or the digital signal is transmitted via an electric telecommunication line, a wireless or wire communication line, a network represented by Internet, or data broadcasting. In addition, the present invention may be a computer system including a microprocessor and a memory where the above-mentioned computer program is recorded in the memory, and the microprocessor operates in accordance with the computer program. In addition, the program or the digital signal may be recorded in the recording medium and transferred, or the program or the digital signal may be transferred via the network so as to be executed by an another independent computer system.

The above-described embodiments and modifications may be combined in an arbitrary manner.

In the above, the embodiments of the invention have been described with reference to the drawings, however, the invention is not limited to the embodiments as shown. Various modifications or variations can be made to the shown embodiments in the same range as that of as the present invention, or in the range of equivalents.

INDUSTRIAL APPLICABILITY

According to the present invention, it is possible to provide an information processing terminal and a confidential information access control method that can protect against leakage of information even when the information processing terminal in which confidential information has been recorded is carried outside and stolen.

REFERENCE SIGNS LIST 101, 701 Nurse-carried terminal
102, 702 Server terminal
201 Input/output receiving unit
202, 1002 Confidential information access control unit
203 Route information holding unit
204, 804 Route information write unit
205 Medium R/W unit
206 Storage area
210 Confidential information
211 General information
301 Request receiving unit
302, 1102 Control unit
303 Route information acquisition unit
304 Current location acquisition unit
305, 1105 Access determination unit
306 Confidential information access unit
807 Communication unit
1107 Current location recording unit
1108 Previous location recording unit
1109 Location update determination unit

The invention claimed is:

1. An information processing terminal for controlling access to confidential information, said terminal comprising:
a storage area in which general information and confidential information are recorded;
an input/output receiving unit configured to receive, from a user, an access command which is a command to access the general information or the confidential information recorded in said storage area;
an accessible area holding unit configured to hold an accessible area designation map which indicates an area of activity in which access to the confidential information is allowed; and
a confidential information access control unit configured to determine whether or not access to the confidential information is allowed in response to receiving the access command to the confidential information by said input/output receiving unit,
wherein said confidential information access control unit includes:
a current location acquisition unit configured to acquire current location information indicating a current location of said information processing terminal;
an access determination unit configured to allow access to the confidential information when the location of said information processing terminal indicated in the current location information is on the accessible area designation map held in said accessible area holding unit; and
a confidential information access unit configured to access the confidential information recorded in said storage area in response to the allowance of the access by said access determination unit,
wherein the accessible area designation map is expressed as a set of a plurality of sections,
the confidential information recorded in said storage area is encrypted with a data key,
the data key is encrypted with a distinct section key assigned to each of the sections, and
said confidential information access unit is configured to generate the section key based on the current location information acquired by said current location acquisition unit, to decrypt the data key with the generated section key, and to decrypt the confidential information recorded in said storage area with the decrypted data key.

2. The information processing terminal according to claim 1,
wherein the accessible area designation map indicates route information of said information processing terminal from a starting point to an arrival point.

3. The information processing terminal according to claim 2,
wherein said accessible area holding unit is configured to hold a plurality of the accessible area designation maps for different routes.

4. The information processing terminal according to claim 2, further comprising
an updating unit configured to update content of said accessible area holding unit with the accessible area designation map which is externally acquired.

5. The information processing terminal according to claim 4, wherein said updating unit includes:
a media read/write unit configured to read the accessible area designation map from an external recording medium; and
a route information write unit configured to write, to said accessible area holding unit, the accessible area designation map read from the external recording medium by said media read/write unit.

6. The information processing terminal according to claim 4,
wherein said updating unit includes:
a communication unit configured to communicate with an external server; and
a route information write unit configured to write, to said accessible area holding unit, the accessible area designation map acquired from the external server by said communication unit.

7. The information processing terminal according to claim 4,
wherein said updating unit is further configured to calculate a first hash value by inputting acquired the accessible area designation map to a predetermined hash function, and
said confidential information access control unit determines whether or not access to the confidential information is allowed when the first hash value calculated by said updating unit is equal to a second hash value obtained by inputting the accessible area designation map held in said accessible area holding unit to the predetermined hash function.

8. The information processing terminal according to claim 1,
wherein said confidential information access control unit is protected using tamper-resistant technology or Reactive Method.

9. The information processing terminal according to claim 1,
wherein the confidential information is recorded in a region of said storage area, having a protection level higher than the protection level of another region in which the general information is recorded.

10. The information processing terminal according to claim 1,
wherein the accessible area designation map is expressed as a set of a plurality of sections,
said confidential information access control unit further includes:
a current location recording unit in which a section corresponding to the current location of said information processing terminal is recorded;
a previous location recording unit in which a section where said information processing terminal has been present immediately before the section recorded in said current location recording unit is recorded; and
a location update determination unit configured to cause said current location acquisition unit to acquire the current location information of said information processing terminal regularly, and when the section corresponding to the acquired current location information is different from the section recorded in said current location recording unit, said location update determination unit overwrites content of said previous location recording unit with the section which is recorded in said current location recording unit, and overwrites content of said current location recording unit with the section corresponding to the acquired current location information,
wherein said access determination unit is configured to allow access to the confidential information when the section corresponding to the current location information acquired by said current location acquisition unit, and the section recorded in said previous location recording unit are adjacent to each other on the accessible area designation map at a timing when an access command to the confidential information is received by said input/output receiving unit.

11. The information processing terminal according to claim 10,
wherein the confidential information recorded in said storage area is encrypted with the data key,
the data key is encrypted with a section key assigned to each of the sections, and
said confidential information access unit generates the section key based on the section corresponding to the current position information acquired by said current location acquisition unit and the section recorded in said previous location recording unit, decrypts the data key with the generated section key, and decrypts the confidential information recorded in said storage area with the decrypted data key.

12. A method of controlling access to confidential information, said method being performed by an information processing terminal including an storage area in which general information and confidential information are recorded, and an accessible area holding unit configured to hold an accessible area designation map, the accessible area designation map indicating an area of activity in which access to the confidential information is allowed, said method comprising:
receiving an access command from a user to the general information or the confidential information recorded in the storage area; and
determining whether or not access to the confidential information is allowed in response to the access command to the confidential information, received in said receiving, said determining includes:
acquiring current location information indicating a current location of the information processing terminal;
allowing access to the confidential information when the location of the information processing terminal indicated by the current location information is on the accessible area designation map held in the accessible area holding unit; and
accessing the confidential information recorded in the storage area in response to the access allowed in said allowing,
wherein the accessible area designation map is expressed as a set of a plurality of sections,
the confidential information recorded in said storage area is encrypted with a data key,
the data key is encrypted with a distinct section key assigned to each of the sections, and
in said accessing, the section key is generated based on the current location information acquired in said acquiring, the data key is decrypted with the generated section key, and the confidential information recorded in said storage area is decrypted with the decrypted data key.

13. The method of controlling access to confidential information according to claim 12,
wherein the accessible area designation map is expressed as a set of a plurality of sections,
said information processing terminal further includes:
a current location recording unit in which a section corresponding to the current location of said information processing terminal is recorded; and
a previous location recording unit in which a section where said information processing terminal has been present immediately before the section recorded in said current location recording unit is recorded,
wherein said determining further includes acquiring the current location information of said information processing terminal regularly, and when the section corresponding to the acquired current location information is different from the section recorded in said current location recording unit, said determining includes overwriting said previous location recording unit with the section which is recorded in said current location recording unit, and overwriting said current location recording unit with a section corresponding to the acquired current location information, and
said access determination unit is configured to allow access to the confidential information when the section corresponding to the current location information acquired by said current location acquisition unit, and the section recorded in the previous location information are adjacent to each other on the accessible area designation map at a timing when an access command to the confidential information is received by said input/output receiving unit.

14. A non-transitory computer-readable recording medium on which a program is recorded, the program causing a computer to execute the method of controlling access to confidential information according to claim 12.

15. An integrated circuit for controlling access to confidential information, comprising:
- a storage area in which general information and confidential information are recorded;
- an input/output receiving unit configured to receive an access command from a user to the general information or the confidential information recorded in said storage area;
- an accessible area holding unit configured to hold an accessible area designation map, the accessible area designation map indicating an area of activity in which access to the confidential information is allowed; and
- a confidential information access control unit configured to determine whether or not access to the confidential information is allowed in response to receiving an access command to the confidential information at said input/output receiving unit,
- wherein said confidential information access control unit includes:
- a current location acquisition unit configured to acquire current location information indicating a current location of said information processing terminal;
- an access determination unit configured to allow access to the confidential information when the location of said information processing terminal indicated by the current location information is on the accessible area designation map held in said accessible area holding unit; and
- a confidential information access unit configured to access to the confidential information recorded in said storage area in response to the access allowed by said access determination unit,
- wherein the accessible area designation map is expressed as a set of a plurality of sections,
- the confidential information recorded in said storage area is encrypted with a data key,
- the data key is encrypted with a distinct section key assigned to each of the sections, and
- said confidential information access unit is configured to generate the section key based on the current location information acquired by said current location acquisition unit, to decrypt the data key with the generated section key, and to decrypt the confidential information recorded in said storage area with the decrypted data key.

* * * * *